(12) United States Patent
Shiraishi et al.

(10) Patent No.: US 12,273,430 B2
(45) Date of Patent: Apr. 8, 2025

(54) PROTOCOL DRIVER CREATING DEVICE

(71) Applicant: SCHNEIDER ELECTRIC JAPAN HOLDINGS LTD., Tokyo (JP)

(72) Inventors: Atsushi Shiraishi, Osaka (JP); Masao Saito, Osaka (JP); Haruhiko Ueki, Osaka (JP); Kenichi Inoue, Osaka (JP)

(73) Assignee: SCHNEIDER ELECTRIC JAPAN HOLDINGS LTD., Tokyo (JP)

(*) Notice: Subject to any disclaimer, the term of this patent is extended or adjusted under 35 U.S.C. 154(b) by 0 days.

(21) Appl. No.: 18/104,619

(22) Filed: Feb. 1, 2023

(65) Prior Publication Data

US 2023/0247115 A1 Aug. 3, 2023

(30) Foreign Application Priority Data

Feb. 3, 2022 (JP) ................................. 2022-015877

(51) Int. Cl.
*H04L 69/12* (2022.01)
*H04L 69/00* (2022.01)

(52) U.S. Cl.
CPC .............. *H04L 69/12* (2013.01); *H04L 69/03* (2013.01)

(58) Field of Classification Search
CPC ......... H04L 69/12; H04L 69/03; H04L 69/26; G06F 8/35; G06F 8/34; G06F 3/0482
See application file for complete search history.

(56) References Cited

U.S. PATENT DOCUMENTS

| 5,862,383 | A | * | 1/1999 | Laitinen | ................. | H04L 9/40 717/109 |
| 5,920,711 | A | * | 7/1999 | Seawright | ................. | H04L 9/40 703/22 |
| 6,931,574 | B1 | * | 8/2005 | Coupal | ................. | H04L 43/18 714/39 |
| 7,751,440 | B2 | * | 7/2010 | Johnston | ................. | H04L 69/22 370/469 |
| 7,881,341 | B2 | * | 2/2011 | Dodd | ................. | H04L 12/40169 370/469 |
| 2019/0182368 | A1 | * | 6/2019 | Tang | ................. | H04L 69/22 |
| 2019/0273674 | A1 | * | 9/2019 | Horn | ................. | H04L 41/22 |
| 2019/0369857 | A1 | * | 12/2019 | Thomas | ................. | G06F 3/0482 |

FOREIGN PATENT DOCUMENTS

JP 2008-71033 3/2008

OTHER PUBLICATIONS

Extended European Search Report dated Jun. 30, 2023, issued for European Application No. 23154281.2 (8 pages).

* cited by examiner

*Primary Examiner* — Rachel J Hackenberg
(74) *Attorney, Agent, or Firm* — Nixon & Vanderhye P.C.

(57) ABSTRACT

A PC includes: a frame designing section configured to design a communications frame of a communications protocol; and a protocol driver generating section configured to generate a protocol driver in accordance with the communications frame having been designed. The frame designing section includes: a providing section configured to provide a graphics object that graphically represents an element of at least one segment of the communications frame and that contains information on the size of the element, in a manner that enables the graphics object to be selected and to be disposed in the at least one segment; and a setting section configured to set the property of the element represented by the graphics object having been disposed.

8 Claims, 18 Drawing Sheets

PROTOCOL DRIVER CREATING DEVICE

This Nonprovisional application claims priority under 35 U.S.C. § 119 on Patent Application No. 2022-015877 filed in Japan on Feb. 3, 2022, the entire contents of which are hereby incorporated by reference.

TECHNICAL FIELD

The present invention relates to a protocol driver creating device for creating a protocol driver.

BACKGROUND ART

A programmable display performs processing specified in a protocol driver compliant with a communications protocol, to communicate with a controller connected thereto. A protocol driver is a program for performing communications. Protocol driver creators are therefore required to have a programming technique. Thus, it is difficult for a person not having a programming technique to easily create a protocol driver. To address such a problem, attempts to make it easy to create a protocol driver are being made.

For example, Patent Literature 1 discloses generating, through interaction with a user, a communications protocol program, which is a protocol driver. Specifically, Patent Literature 1 discloses performing configuration by describing a necessary numerical value in a blank of a table (referred to as a "skeleton") which forms a communications frame (FIGS. 4 and 5 of Patent Literature 1).

CITATION LIST

Patent Literature

[Patent Literature 1]
Japanese Patent Application Publication Tokukai No. 2008-71033

SUMMARY OF INVENTION

Technical Problem

However, Patent Literature 1 does not disclose detailed editing methods such as a table addition method and a table deletion method. For example, it is necessary to acquire the number of digits of an address, the number of digits of data, and the like from a device information table (FIG. 7 of Patent Literature 1) different from the table described above. Thus, the protocol driver creating approach disclosed in Patent Literature 1 is ambiguous and very hard to understand. It is therefore impossible to easily create a protocol driver by such a protocol driver creating approach.

An object of an aspect of the present invention is to make the creation of a protocol driver easy.

Solution to Problem

In order for the above problem to be solved, a protocol driver creating device, in accordance with an aspect of the present invention, for creating, with use of a graphical user interface, a protocol driver which is compliant with a communications protocol and which is used by a programmable display for communicating with a controller, the protocol driver creating device including: a frame designing section configured to design a communications frame of the communications protocol; and a generating section configured to generate the protocol driver in accordance with the communications frame having been designed, the frame designing section including: a providing section configured to provide a graphics object that graphically represents an element of at least one segment of the communications frame and that contains size information on the size of the element, in a manner that enables the graphics object to be selected and to be disposed in the at least one segment; and a setting section configured to set attribute information on the attribute of the element represented by the graphics object having been disposed, and to perform at least one of the group consisting of provision of the attribute information in a manner selectable from among alternatives and provision of an input field that enables the attribute information to be inputted, in order to set the attribute information.

Advantageous Effects of Invention

With an aspect of the present invention, it is possible to make the creation of a protocol driver easy.

DESCRIPTION OF EMBODIMENTS

Embodiment 1

The following description will discuss Embodiment 1 of the present invention on the basis of FIGS. 1 to 12.

Figure 1:
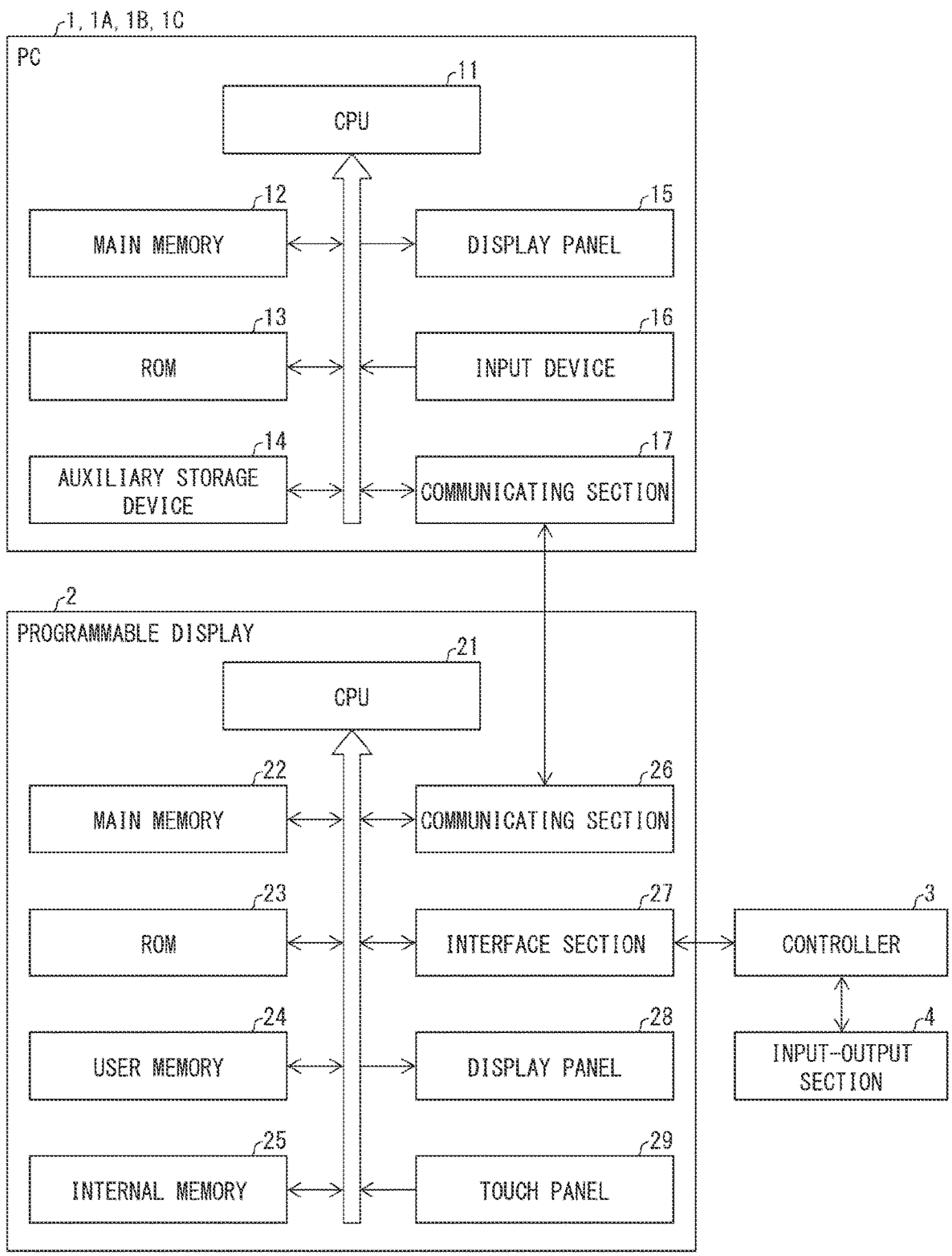
FIG. 1 is a block diagram of the hardware configuration of a PC and a programmable display in accordance with Embodiments 1 to 4 of the present invention.
Figure 2:
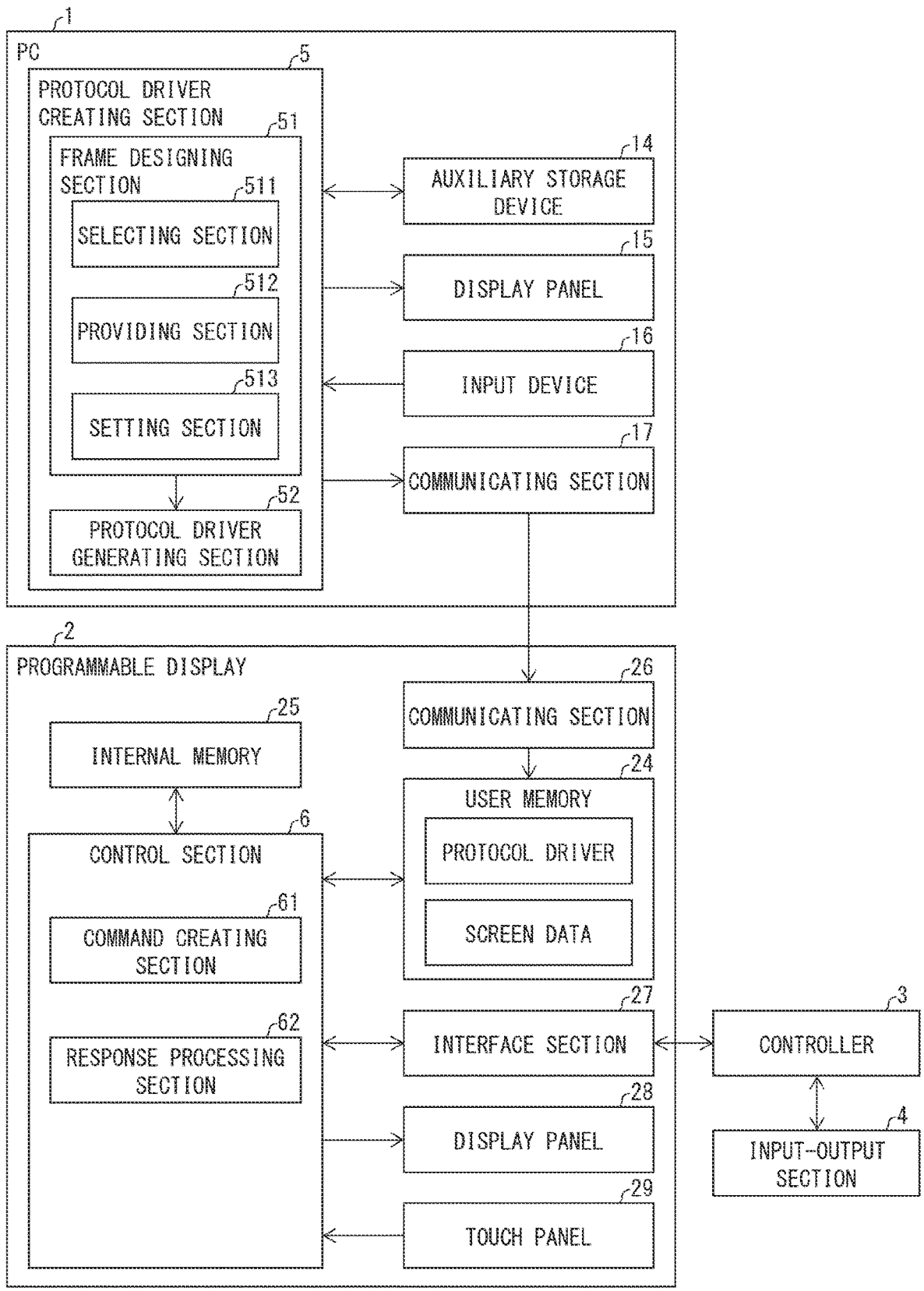
FIG. 2 is a block diagram of the system configuration of the PC and the programmable display.

FIG. 1 is a block diagram of the hardware configuration of a PC 1 and a programmable display 2 in accordance with Embodiment 1. FIG. 2 is a block diagram of the system configuration of the PC 1 and the programmable display 2.

The hardware configuration of the PC 1 and the programmable display 2 is described first.

The PC 1 is a personal computer implementing a universal operating system (OS), as illustrated in FIG. 1. The PC 1 is provided with an environment in which to execute an application program, as described below.

The PC 1 includes: a central processing unit (CPU) 11; a main memory 12; a read only memory (ROM) 13; an auxiliary storage device 14; a display panel 15; an input device 16; and a communicating section 17, as illustrated in FIG. 1.

The CPU 11 is a processing device that executes an application program under the control of the OS. Specifically, in a case of executing an application program, the CPU 11 receives data from, for example, the auxiliary storage device 14 and the input device 16, and outputs the results of computation or processing performed on the data, to, for example, the auxiliary storage device 14 and the display panel 15.

The main memory 12 is a memory of the main storage device of the PC 1, and is formed by a dynamic random access memory (DRAM). The ROM 13 stores, in addition to the OS, programs essential to the operation of the PC 1, including a basic input output system (BIOS) to be executed when the PC 1 is booted and reset.

The auxiliary storage device 14 is provided to store various kinds of data, an application program, etc. that should be held by the PC 1. The auxiliary storage device 14 is formed by a hard disk drive (HDD), a solid state drive (SSD), and the like.

The display panel 15 is provided to display screens such as a screen for implementing basic actions on the PC 1 and a screen displayed as a result of the execution of an application program.

The input device 16 is a device for accepting various kinds of inputs in response to user actions. As the input device 16, a mouse, a keyboard, a touch panel, and the like are provided.

The communicating section 17 has the function of communicating with the programmable display 2. The communicating section 17 sends the communications protocol created by the PC 1 to the programmable display 2.

Next, the hardware configuration of the programmable display 2 will be described.

The programmable display 2 is embedded equipment implementing a dedicated OS and is dedicated equipment having the function of executing a human machine interface (HMI) program for implementing the various functions of the programmable display 2. The programmable display 2 is a dedicated computer improved in, for example, dust resistance, drip proofness, and vibration resistance in order to adapt to extreme environments of industrial plants or the like.

The programmable display 2 includes: a central processing unit (CPU) 21; a main memory 22; a read only memory (ROM) 23; a user memory 24; an internal memory 25; a communicating section 26; an interface section 27; a display panel 28; and a touch panel 29.

The CPU 21 is a processing device that execute a human machine interface (HMI) program for implementing the HMI functions of the programmable display 2 Specifically, in a case of executing the HMI program, the CPU 21 receives data from, for example, the main memory 22, the user memory 24, the internal memory 25, and the touch panel 29, and outputs the results of computation or processing performed on the data, to, for example, the main memory 22, the user memory 24, the internal memory 25, and the display panel 28.

The main memory 22 is a memory of the main storage device of the programmable display 2, and is formed by a dynamic random access memory (DRAM).

The ROM 23 stores, in addition to the OS, programs essential to the operation of the programmable display 2, including a basic input output system (BIOS) to be executed when the programmable display 2 is booted and reset.

The user memory 24 is a memory that stores, for example, data created by a user, such as screen data for displaying an HMI screen (which will be described later), and a protocol driver for communicating with a controller 3. The user memory 24 is formed by a flash erasable and programmable ROM (FEPROM) and the like.

The internal memory 25 is a memory that temporarily stores, for example, data acquired from the controller 3 and data to be given to the controller 3.

The communicating section 26 communicates with the PC 1 to receive a protocol driver created by the PC 1 and sent from the PC 1. Examples of the communications performed by the communicating section 26 include, but not limited to, communications via a USB cable.

The interface section 27 is a connecting section for establishing a connection with the controller 3 so as to be capable of communications with the controller 3. The interface section 27 includes various interfaces such as a serial interface and an interface for a local area network (LAN).

The controller 3 is equipment such as a programmable logic controller (PLC), a temperature controller, or a motor controller, and has the function of communicating with the programmable display 2. The controller 3 gives data to the input-output section 4 and receives data from the input-output section 4. Used as the input-output section 4 are input equipment such as a sensor or a switch and output equipment such as an actuator, a motor, a relay, a solenoid valve, or a display. The controller 3 includes a device memory for storing the status of the input-output section 4. Hereinafter, the device memory can be referred to as "device".

The display panel 28 displays an HMI screen based on the screen data stored in the user memory 24. As the display panel 28, a flat display panel such as a liquid crystal display panel or an electro-luminescence (EL) display panel is used.

The touch panel 29 is disposed on the display panel 28. The touch panel 29 receives a touch action performed on the screen displayed on the display panel 28, and outputs a touch action signal which serves as an input signal.

Next, the system configuration of the PC 1 will be described.

The PC 1 includes a protocol driver creating section 5 that creates a protocol driver compliant with a communications protocol, as illustrated in FIG. 2. The PC 1, which includes the protocol driver creating section 5, functions as a protocol driver creating device.

The protocol driver creating section 5 is a functional block section implemented through execution, by the CPU 11, of the protocol driver creation program, which is an application program. The protocol driver creating section 5 provides a user with an environment in which to create a protocol driver with use of a graphical user interface. The protocol driver creating section 5 will be described later in detail.

The protocol driver is a program by which the programmable display 2 communicates with the controller 3, and is compliant with a communications protocol that specifies a communications procedure. The communications protocol specifies respective properties (attribute information) of a header part, a body part, and a footer part that constitute the communications frame. The communications protocol contains the body part, which is an essential component of the communications protocol, and contains the header part and the footer part where necessary. The communications protocol is downloaded by the PC 1 to the programmable display 2 to be saved in the user memory 24.

Further, the system configuration of the programmable display 2 will be further described.

As illustrated in FIG. 2, the programmable display 2 includes a control section 6, which is a section having the control function.

The control section 6 is a section, having HMI functions, implemented by execution of the HMI programs by the CPU 21.

The HMI functions include an instruction generating function, a data acquiring function, and a screen display function. The instruction generating function is the function of generating an instruction, responsive to an input action of a user, to be issued to the controller 3. The data acquiring function is the function of acquiring various kinds of data from the controller 3. The screen display function is the function of displaying an HMI screen for displaying the acquired various kinds of data and accepting the above input actions. In order to implement the HMI functions, the control section 6 controls not only the display of the HMI screen but also each of the sections, to be controlled, of the programmable display 2 on the basis of the input action of the user and a change in data held in the controller 3. The control section 6 also includes a command creating section 61 and a response processing section 62.

The user memory 24 stores screen data created by the user, as well as the protocol driver described above. The screen data is data for displaying, via the control section 6 of the programmable display 2, an HMI screen on the display panel 28. The screen data is a screen on which, for example, the status of the input-output section 4 connected to the controller 3 is displayed and an action performed on the touch panel 29 is accepted.

The command creating section 61 creates a command to be given to the controller 3, in accordance with the protocol driver stored in the user memory 24. The response processing section 62 performs predetermined processing of a response received from the controller 3 and thereby acquires data from the controller 3.

Here is the detailed description of the protocol driver creating section 5.

Figure 3:
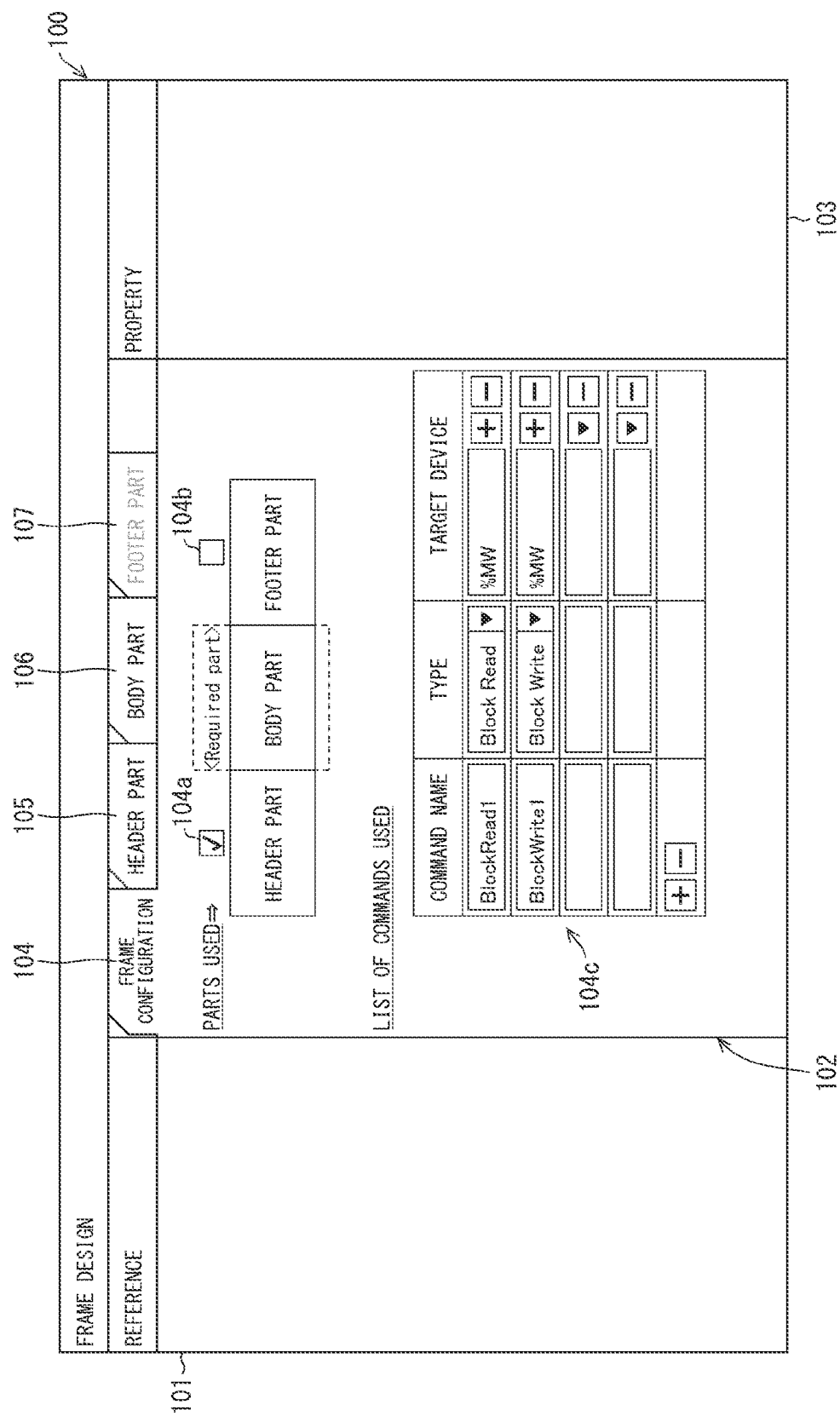
FIG. 3 is a diagram of a frame design screen provided by a protocol driver creating section of the PC.
Figure 4:
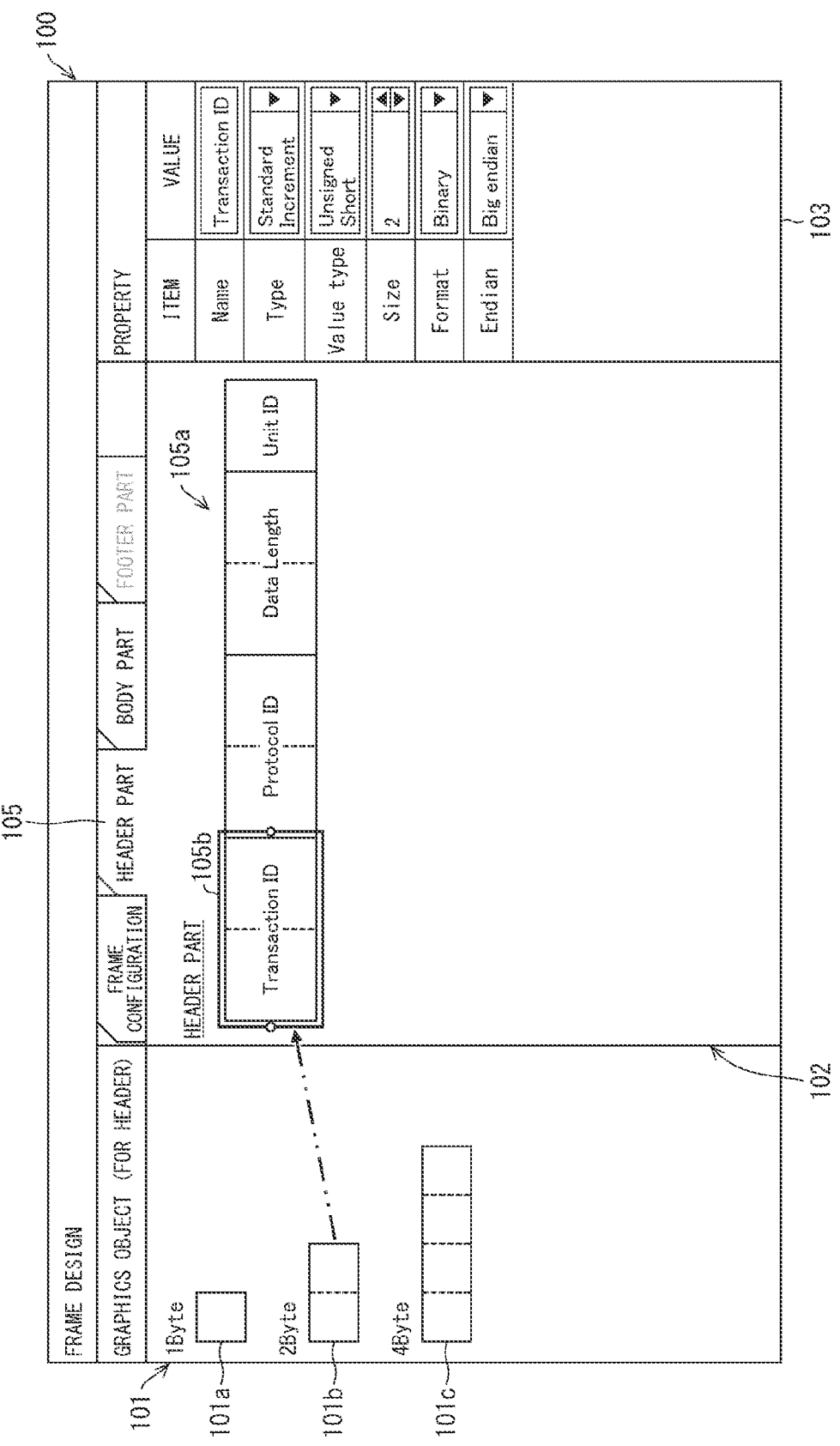
FIG. 4 is a diagram of the configuration of the frame design screen that is used for designing the header part of a communications frame.
Figure 5:
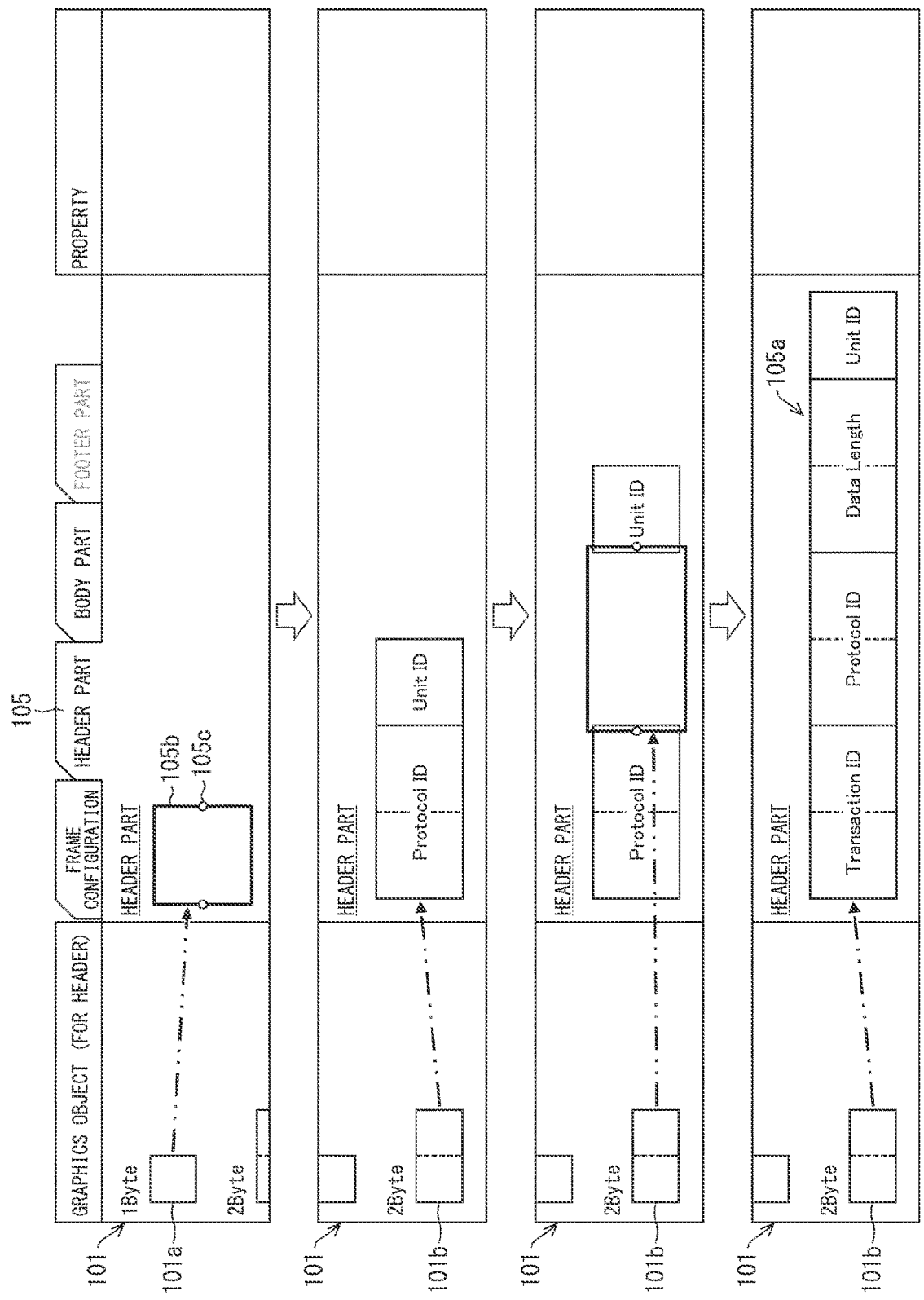
FIG. 5 is a diagram of a procedure for creating the header part by disposing, in the frame design screen illustrated in FIG. 4, graphics objects representing elements that constitute the header part.
Figure 6:
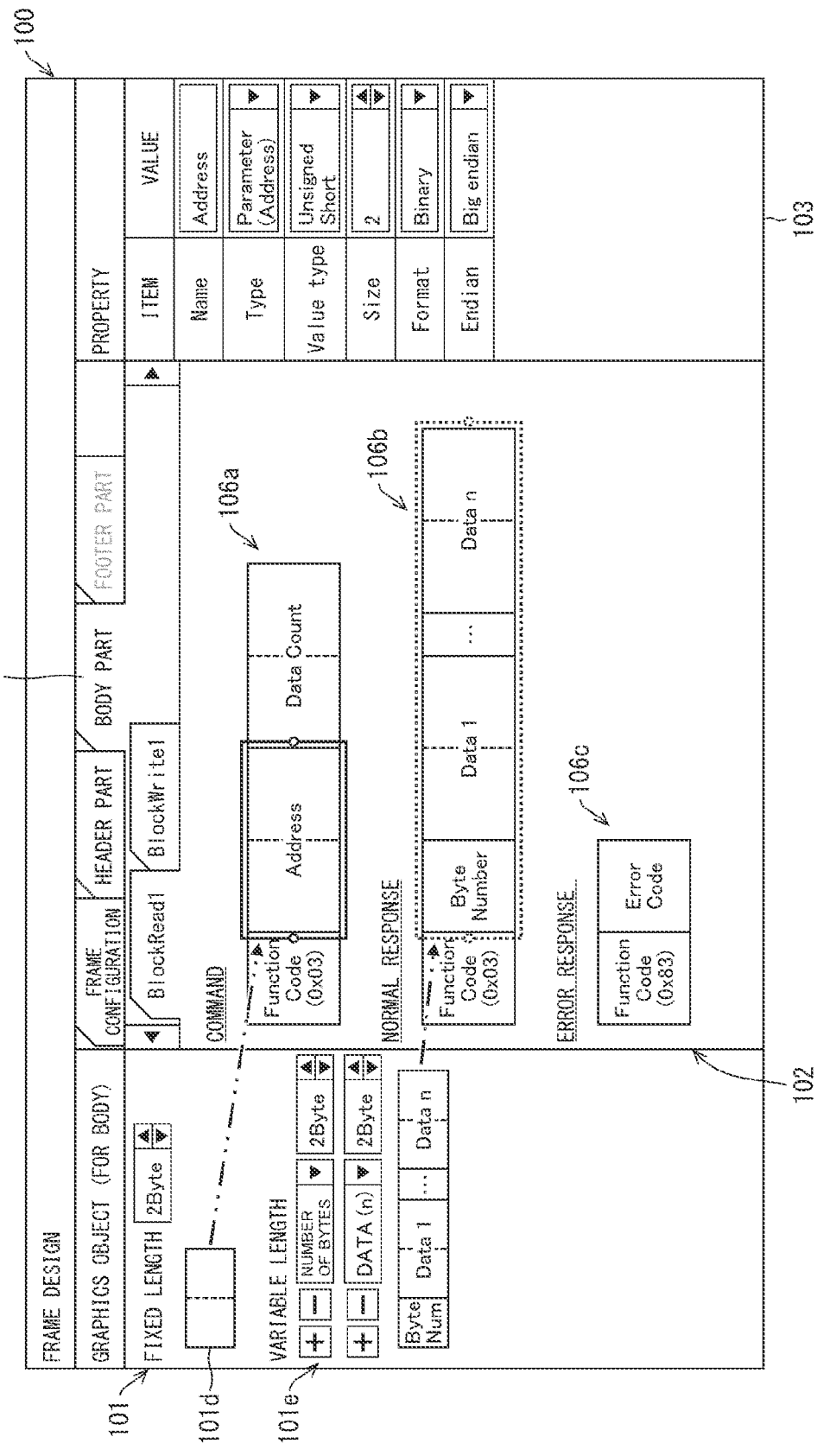
FIG. 6 is a diagram of the configuration of the frame design screen that is used for designing the body part of the communications frame.

FIG. 3 is a diagram of the configuration of a frame design screen 100 provided by the protocol driver creating section 5. FIG. 4 is a diagram of the configuration of the frame design screen 100 that is used for designing the header part of a communications frame. FIG. 5 is a diagram of a procedure for creating the header part by disposing, in the frame design screen 100, graphics objects representing elements that constitute the header part. FIG. 6 is a diagram of the configuration of the frame design screen 100 that is used for designing the body part of the communications frame.

The protocol driver creating section 5 includes a frame designing section 51 and a protocol driver generating section 52 (generating section), as illustrated in FIG. 2.

The frame designing section 51 designs the communications frame of a communications protocol. In order to assist in designing the communications frame, the frame designing section 51 provides a user with the frame design screen 100, which serves as a graphical user interface, illustrated in FIG. 3 by displaying the frame design screen 100 on the display panel 15.

The frame design screen 100 includes a reference area 101, a design area 102, and a property setting area 103.

The reference area 101 is an area for providing information necessary to design a communications frame in the design area 102. The design area 102 is an area for designing the communications frame. The property setting area 103 is an area for setting the property of each of a plurality of segments that constitute the communications frame.

The frame designing section 51 includes a selecting section 511, a providing section 512, and a setting section 513.

The selecting section 511 makes selectable each of a header part, a body part, and a footer part which are the plurality of segments, to make the communications frame constituted by the three segments capable of being designed in such a manner that the segments are separately set. Specifically, the selecting section 511 accepts actions of a user in the design area 102 to assist in selecting the segments and designing each of the segments. Note that the body part is not required to be selected by the user because the body part is the essential component of the communications frame. Furthermore, in a case where the communications frame is constituted by a single segment, the selecting section 511 accepts actions of a user in the design area 102 to assist in designing the segment.

The design area 102 includes: a frame configuration window 104; a header part design window 105; a body part design window 106; and a footer part design window 107. Each of the windows are provided in the form of a tub so that the display can be switched by actions of a user via the input device 16.

The frame configuration window 104 includes check boxes 104a and 104b; and a command list 104c.

The check box 104a is provided so that a user selects the header part as the segment to be designed. The check box 104b is provided so that the user selects the footer part as the segment to be designed.

The command list 104c is provided for inputting various kinds of information concerning the command specified in the body part. The command list 104c includes: an area (a command name area) in which to input the name of a command; an area (a command type area) in which to input the type of the command; and an area (an address area) in which to input the address of a device memory on which execution of the command is performed. The command name area is provided such that a user directly describe a command name in the command name area. The command type area is provided such that the type of a command is selectable by a spin button. The address area is provided such that the number of addresses can be increased and decreased via a spin button.

The selecting section 511 determines to use, as a segment to be designed, a segment corresponding to the check box 104a or 104b checked by a user via the input device 16. In addition, the selecting section 511 registers, with the body part, a command inputted to the command list 104c by the user via the input device 16, in order to make possible the detailed design of the command based on the information concerning the command.

As illustrated in FIG. 6, the body part design window 106 is provided with windows for the respective commands registered with the body part via the command list 104c, the windows being in the form of tabs so as to be switchable.

As illustrated in FIGS. 4 and 6, the providing section 512 provides, to the reference area 101, graphics objects 101a to 101e that graphically represent elements constituting a selected segment of the communications frame and that contain information on the sizes of the elements, in a manner that enables the graphics objects to be selected and to be disposed in the selected segment. Specifically, the providing section 512 disposes, in the design area 102, the graphics objects 101a to 101e displayed in the reference area 101, according to an action of drag and drop to the design area 102, the action being performed by the user via the input device 16.

For example, the graphics object 101a and the graphics object 101b are sequentially disposed in the design area 102 through the drag and drop actions, and are joined to the element 105b accordingly, so that a header part 105a is formed, as illustrated in FIG. 5. In addition, a marker 105c are provided to the element 105b disposed in the design area 102. The providing section 512 changes the size of the element 105b through an action, performed by the user, of dragging the marker 105c.

The graphics object 101a represents an element size of 1 Byte which is the smallest, and has the shape of a rectangle. The graphics object 101b represents an element size of 2 Byte, and has the shape of a rectangle given by two graphics objects 101a arranged horizontally. The graphics object 101c represents an element size of 4 Byte, and has the shape of a rectangle given by four graphics objects 101a arranged horizontally. The shapes of the graphics objects 101a to 101c are not limited to a rectangle.

In designing the body part, the providing section 512 may display, in the reference area 101, the graphics object 101d that has a fixed length and the graphics object 101e that has a variable length. It is possible to increase and decrease the value of the fixed length via a spin button. It is possible to increase and decrease the value (the number of bytes) of the variable length and the data number of the variable length via respective spin buttons. The graphics object 101e may contain the number of pieces of data, the number being set so as to be capable of being increased and decreased, although this is not illustrated.

Thus, through the action of dragging and dropping the graphics object 101d having a fixed length, a command 106a is formed in the design area 102. In addition, through the action of dragging and dropping the graphics object 101e having a variable length, a normal response 106b and an error response 106c are formed in the design area 102.

The setting section 513 sets the property of the element 105b represented by the graphics objects 101a to 101c that have been disposed. Specifically, the setting section 513 performs, in the property setting area 103, at least one of the group consisting of provision of a value of each of the items of the property in a manner selectable from among alternatives and provision of an input field that enables the value to be inputted, in order to set the property.

The items to be provided in a selectable manner include information on the device, the address, the number of pieces of data, the name of a variable, and an error code. Information that requires calculation, such as a checksum, a CRC, or an automatic addition, may be also provided in a selectable manner. The items that can be inputted include fixed values such as a command/response code and a start/end code. Examples of the items that may be in the aspect of either the selectable manner or the manner that enables values to be inputted include: items concerning the size such as the number of bytes and the number of pieces of data (the length of data); and an item concerning the configuration such as the body of data. Further, a script or the like that provides free calculation may be freely inputted in accordance with the format in the property setting area 103.

Assume that, for example, the element 105b which is a "Transaction ID" is disposed in the design area 102, as illustrated in FIG. 4. In this case, the setting section 513 displays, in the property setting area 103, items for setting the property of the "Transaction ID" and input fields in which to input a value corresponding to each of the items. Illustrated in FIG. 4 by way of example is an input field in which a value is selectable by a user via a spin button. Depending on the element 105b, an input field in which a user can directly input the value is displayed.

In a case of a need for an item having features different from those of the items prepared in advance, items separately prepared may be imported from outside and be added accordingly.

The protocol driver generating section 52 generates a communications protocol in accordance with the communications frame designed by the frame designing section 51. Specifically, the protocol driver generating section 52 describes a protocol driver in accordance with, for example, each of the segments of the communications frame, the sizes of the elements constituting each of the segments, and attribute information on the attribute of each of the elements which are specified in the communications protocol.

The following description will discuss how the PC 1, which has the configuration as described above, operates when creating the protocol driver.

First, with the frame configuration window 104 being displayed in the frame design screen 100 as illustrated in FIG. 3, the user selects at least one selected from the group consisting of the header part and the footer part and inputs various kinds of information on the command to be specified in the body part. For example, in a case where the header part is selected and the footer part is not selected, the selecting section 511 makes selectable the header part design window 105 concerning the header part and makes unselectable the footer part design window 107 concerning the footer part.

Subsequently, with the header part design window 105 being displayed in the frame design screen 100 as illustrated in FIG. 4, the user drags any one of the graphics objects 101a to 101c from the reference area 101 and drops the same in the design area 102. Thus, the providing section 512 adds element 105b in the design area 102 as illustrated in FIG. 5, and thereby forms the header part 105a as illustrated in FIG. 4.

In addition, the user determines, for each of the elements 105b, the property in terms of the items displayed in the property setting area 103 by at least one approach selected from the group consisting of selection and input. Thus, the setting section 513 sets the property determined by the user.

Next, with the body part design window 106 being displayed in the frame design screen 100 as illustrated in FIG. 6, the user performs an action of disposing the graphics object 101d or 101e. Specifically, the user drags the graphics object 101d or 101e from the reference area 101 and drops the same in the design area 102, for each of the commands having been registered. Thus, the providing section 512 sequentially adds elements in the design area 102 to form each of the command 106a, the normal response 106b, and the error response 106c that constitute the body part.

In addition, the user determines, for each element, the property in terms of the items displayed in the property setting area 103 by at least one approach selected from the group consisting of selection and input. Thus, the setting section 513 sets the property determined by the user.

In designing the communications frame, although the header part may be designed before the design of the body part, as described above, the order in which the header part and the body part are designed may be reversed.

After the design of each of the segments of the communications frame is performed in the manner described above, the frame designing section 51 saves, in the auxiliary storage device 14, the frame design data obtained as a result of the design. When instructed by the user to generate a protocol driver, the protocol driver generating section 52 reads the frame design data from the auxiliary storage 14 device and generates a communications protocol in accordance with the frame design data. The protocol driver generating section 52 then saves the generated protocol driver in the auxiliary storage device 14.

When instructed by the user to download the protocol driver, the protocol driver creating section 5 reads the protocol driver from the auxiliary storage device 14 and causes the communicating section 17 to send the protocol driver to the programmable display 2. When receiving the protocol driver sent from the PC 1, the control section 6 of the programmable display 2 saves the protocol driver in the user memory 24.

The following description will discuss how the programmable display 2 operates when communicating with use of the protocol driver. First, the processing in which a command is sent will be discussed.

Figure 7:
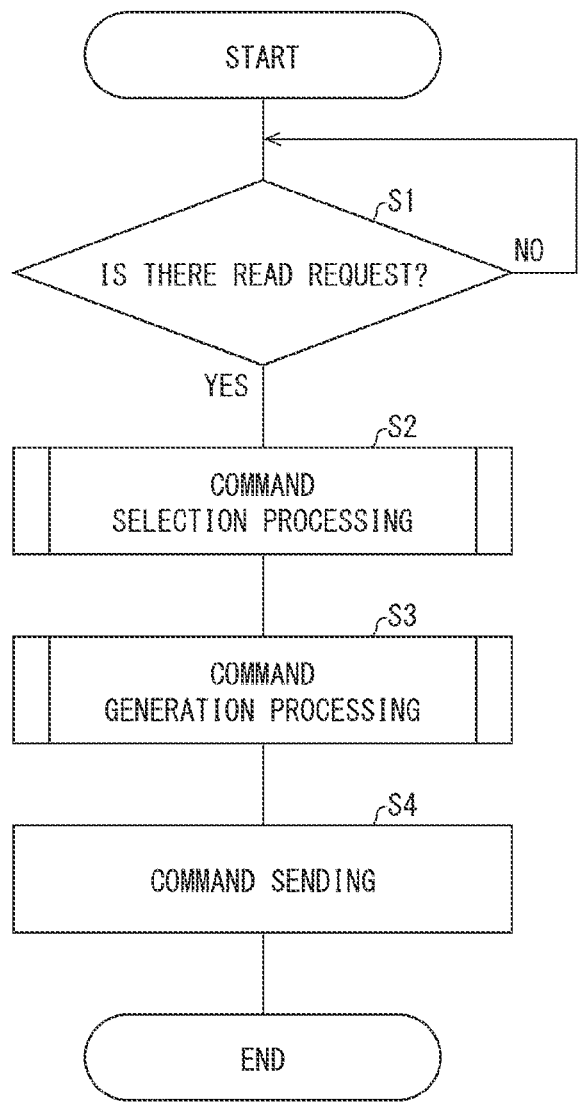
FIG. 7 is a flowchart of a procedure of processing in which the programmable display sends a command to a controller with use of a protocol driver created by the PC.
Figure 8:
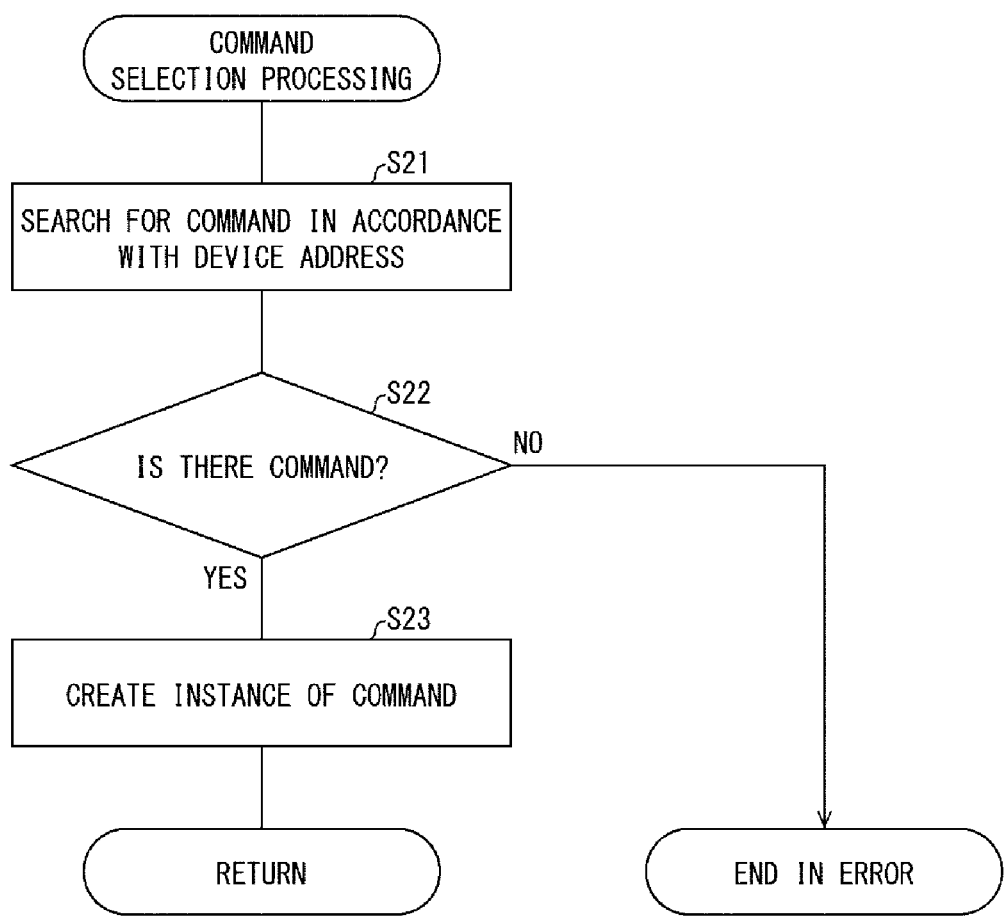
FIG. 8 is a flowchart specifically illustrating command selection processing included in the procedure of the processing illustrated in FIG. 7.
Figure 9:
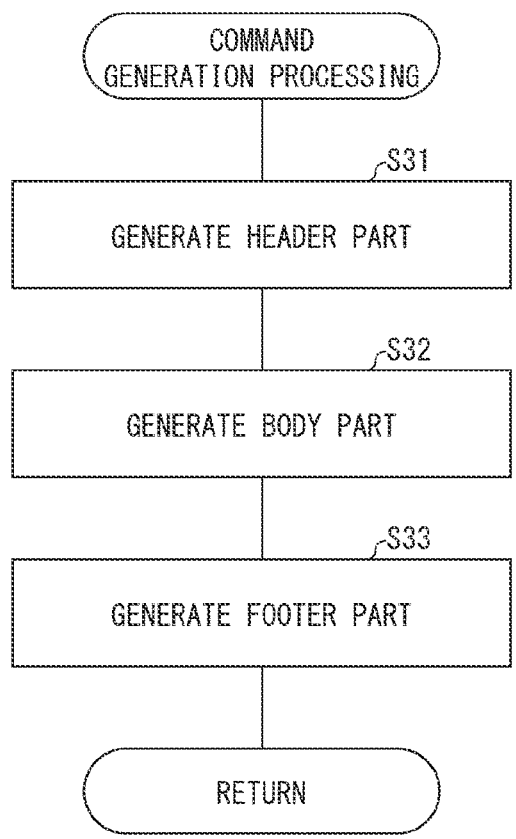
FIG. 9 is a flowchart specifically illustrating command generation processing included in the procedure of the processing illustrated in FIG. 7.

FIG. 7 is a flowchart of a procedure of processing in which the programmable display 2 sends a command to the controller 3 with use of the protocol driver created by the PC 1. FIG. 8 is a flowchart specifically illustrating command selection processing included in the procedure of the processing illustrated in FIG. 7. FIG. 9 is a flowchart specifically illustrating command generation processing included in the procedure of the processing illustrated in FIG. 7.

First, the command creating section 61 of the control section 6 determines whether there is a request for reading data from the controller 3 (step S1), as illustrated in FIG. 7. When the user perform, on the HMI screen displayed on the display panel 28, the action for acquiring data from the controller 3, a touch signal is outputted from the touch panel 29. Until receiving the touch signal, the command creating section 61 waits on the basis of a determination that there is no read request (NO). When receiving the touch signal, the command creating section 61 determines that there is a read request (YES). When determining, in step S1, that there is a read request, the command creating section 61 performs command selection processing (step S2). Note that in a case where a setting of displaying, on the HMI screen, the latest data inside the controller 3 has been made, the control section 6 issues a read request for cyclically reading the latest data.

In the command selection processing, the command creating section 61 searches for a command specified in the communications protocol, in accordance with a device address at which necessary data is stored (step S21), as illustrated in FIG. 8. The command creating section 61 determines whether there is a command corresponding to the device address (step S22).

When determining, in step S22, that there is a command corresponding to the device address (YES), the command creating section 61 creates an instance of the command (step S23). In addition, when determining, in step S22, that there is no command corresponding to the device address (NO), the command creating section 61 determines that an error occurs and ends the processing of sending a command.

After creating the instance of the command, the command creating section 61 brings the processing back to the main routine illustrated in FIG. 7, and performs the command generation processing (step S3). In the command generation processing, the command creating section 61 generates the header part of the instance (step S31), generates the body part of the instance (step S32), and generates the footer part of the instance (step S33), in accordance with information specified in the protocol driver, as illustrated in FIG. 9.

After generating a command as described above, the command creating section 61 brings the processing back to the main routine illustrated in FIG. 7 and performs the processing of sending the command (step S4), and ends the processing. The command creating section 61 causes the interface section 27 to send the command to the controller 3, in the processing of sending the command.

Next, processing of a response will be discussed.

Figure 10:
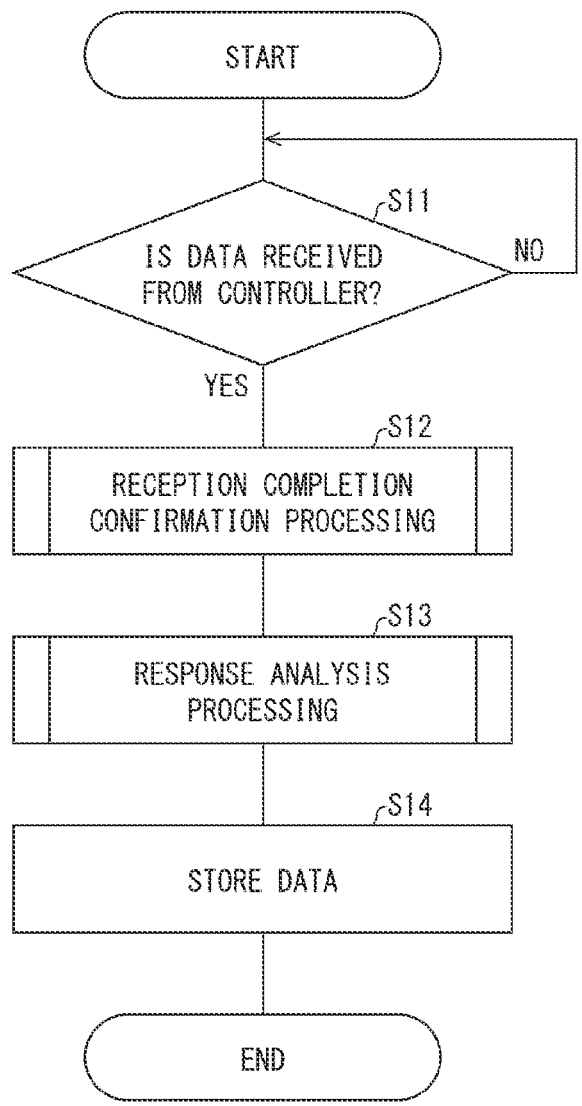
FIG. 10 is a flowchart of a procedure of processing in which the programmable display receives a response from the controller with use of the protocol driver created by the PC.
Figure 11:
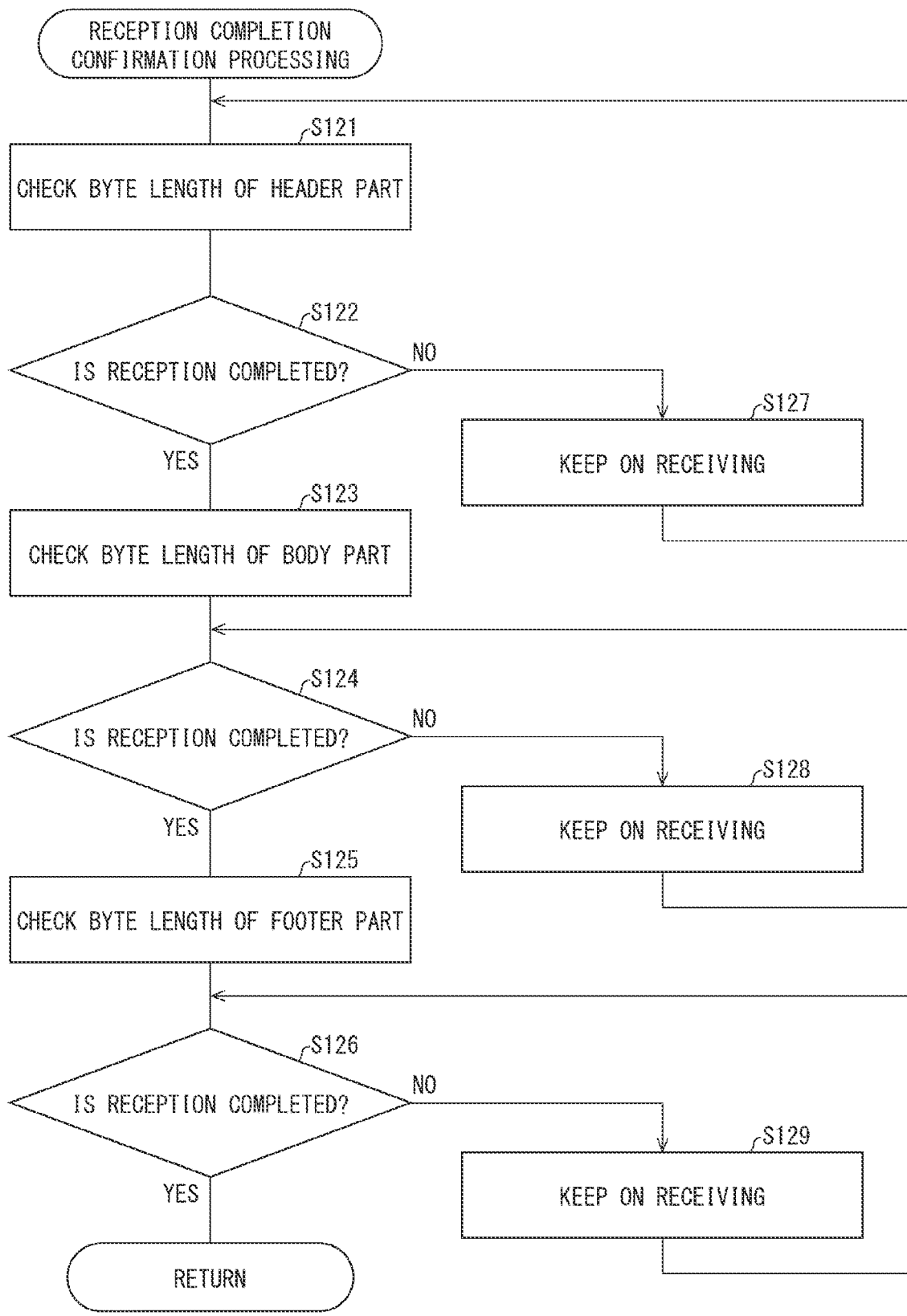
FIG. 11 is a flowchart specifically illustrating reception completion confirmation processing included in the procedure of the processing illustrated in FIG. 10.
Figure 12:
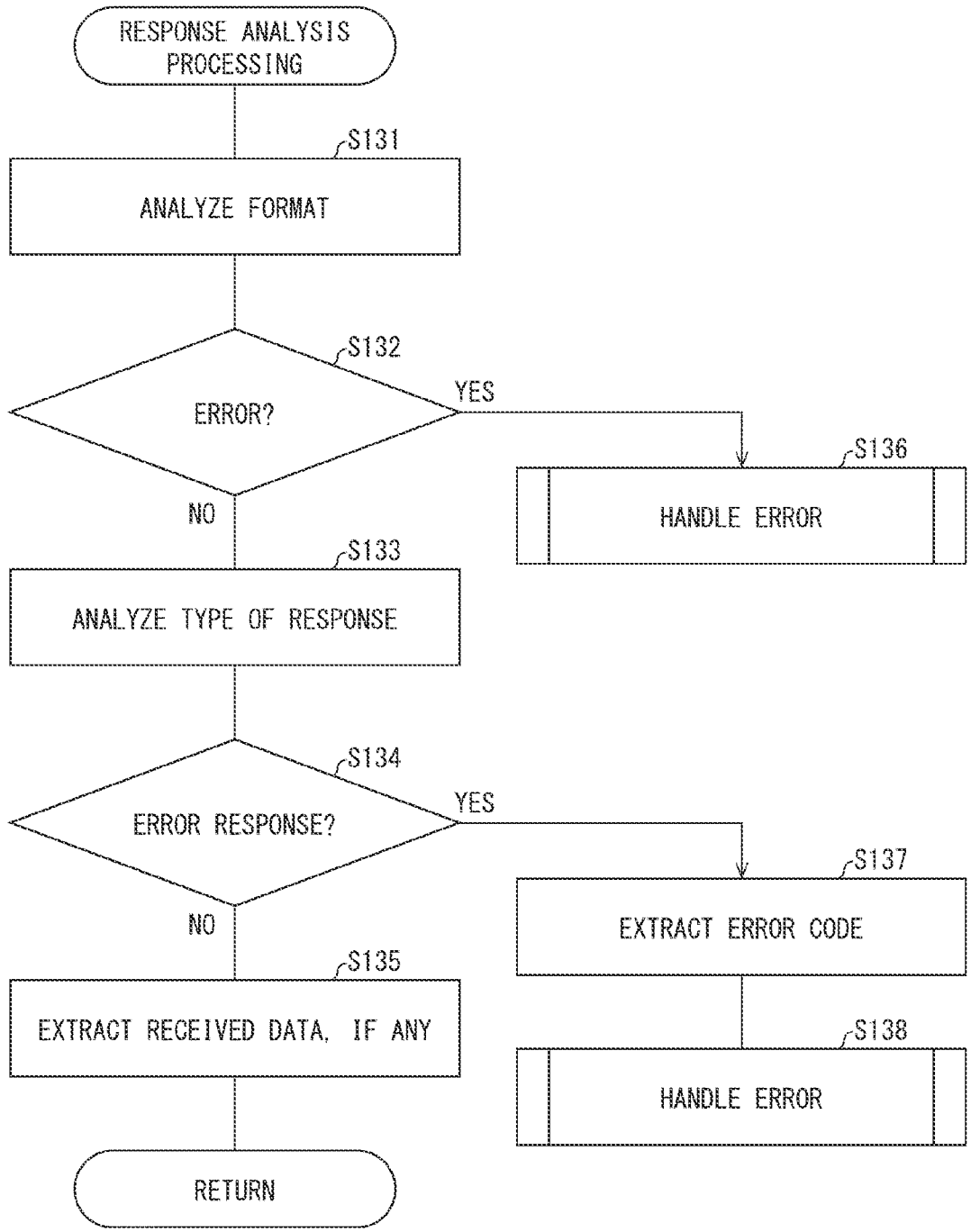
FIG. 12 is a flowchart specifically illustrating response analysis processing included in the procedure of the processing illustrated in FIG. 10.

FIG. 10 is a flowchart of a procedure of processing in which the programmable display 2 receives a response from the controller 3 with use of the protocol driver created by the PC 1. FIG. 11 is a flowchart specifically illustrating reception completion confirmation processing included in the procedure of the processing illustrated in FIG. 10. FIG. 12 is a flowchart specifically illustrating response analysis processing included in the procedure of the processing illustrated in FIG. 10.

First, the response processing section 62 of the control section 6 determines whether data from the controller 3 is received (step S11), as illustrated in FIG. 10. Until receiving data, the response processing section 62 waits on the basis of a determination that data has not been received (NO) in step S11. In addition, when determining that data has been received in step S11 (YES), the response processing section 62 performs the reception completion confirmation processing (step S12).

In the reception completion confirmation processing, the response processing section 62 checks the byte length of the header part of the received data (step S121), and determines whether reception of the header part is completed (step S122), as illustrated in FIG. 11.

When determining, in step S122, that the reception is completed (YES), the response processing section 62 checks the byte length of the body part of the received data (step S123), and determines whether reception of the body part is completed (step S124).

When determining, in step S124, that the reception is completed (YES), the response processing section 62 checks the byte length of the footer part of the received data (step S125), and determines whether reception of the footer part is completed (step S126). When determining, in step S126, that the reception is completed (YES), the response processing section 62 brings the processing back to the main routine illustrated in FIG. 10, and performs the response analysis processing (step S13).

When determining, in steps S122, S124, and S126, that the reception is not completed (NO), the response processing section 62 brings the processing back respectively to the steps S121, S124, and S126.

The response processing section 62 analyzes the format of the received data in the response analysis processing (step S131), as illustrated in FIG. 12. As a result of the analysis of the format, the response processing section 62 determines whether an error occurs (step S132). When determining, in step S132, that no error has occurred (NO), the response processing section 62 analyzes the type of the response (step S133).

The response processing section 62 determines whether the response is an error response in accordance with the result of the analysis of the type of the response (step S134). When determining, in step S134, that the response is not an error response (NO), the response processing section 62 extracts the received data, if any (step S135).

When determining, in step S132, that an error has occurred (YES), the response processing section 62 handles the error (step S136). In addition, when determining, in step S134, that the response is an error response (YES), the response processing section 62 extracts an error code from the received data (step S137), and handles the error (step S138).

After ending the processing of step S135, the response processing section 62 brings the processing back to the main routine illustrated in FIG. 10, stores the data received from the controller 3 in the internal memory 25 (step S14), and ends the processing.

As described above, the PC 1 in accordance with Embodiment 1 includes the frame designing section 51 including the providing section 512 and the setting section 513 and the protocol driver creating section 5 including the protocol driver generating section 52. With this arrangement, it is possible to provide a user interface via which to select and dispose a graphics object representing an element and to set the property of the disposed element in detail and which is therefore clear and very easy to understand. This makes it possible to efficiently create a protocol driver.

The frame designing section 51 includes the selecting section 511. This makes it possible to, for each of a plurality of segments into which a communications frame is divided, determine the sizes of the elements constituting that segment and set information on the attribute of each of the elements. It is therefore possible to efficiently design a communications frame constituted by a plurality of segments.

The selecting section 511 provides a header part, a body part, and a footer part that are the plurality of segments. With this configuration, for the body part, which is the essential component of a communications frame, the sizes of the elements of the body part may be set, and information on the attributes of the elements of the body part may be set, and for at least one part selecting from the group consisting of the header part and the footer part, which are provided where necessary, the sizes of the elements of the at least one part may be determined and information on the attributes of the elements of the at least one part may be set.

Embodiment 2

The following description will discuss Embodiment 2 of the present invention on the basis of FIG. 1 and FIGS. 13 to 15. In Embodiment 2, a component the same in function as a component in Embodiment 1 is assigned the same reference sign as is the component in Embodiment 1, and the description thereof is omitted.

Figure 13:
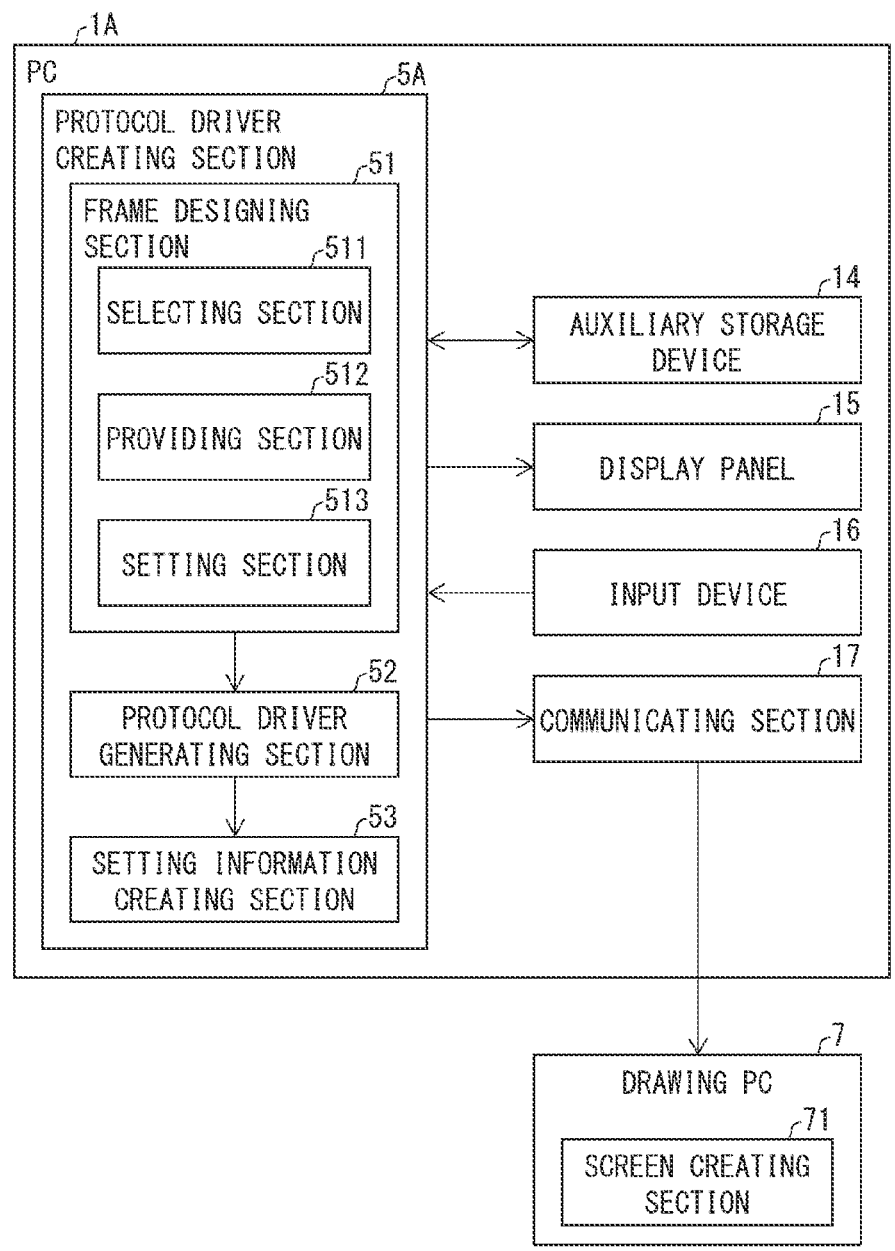
FIG. 13 is a block diagram of the system configuration of a PC in accordance with Embodiment 2 of the present invention.
Figure 14:
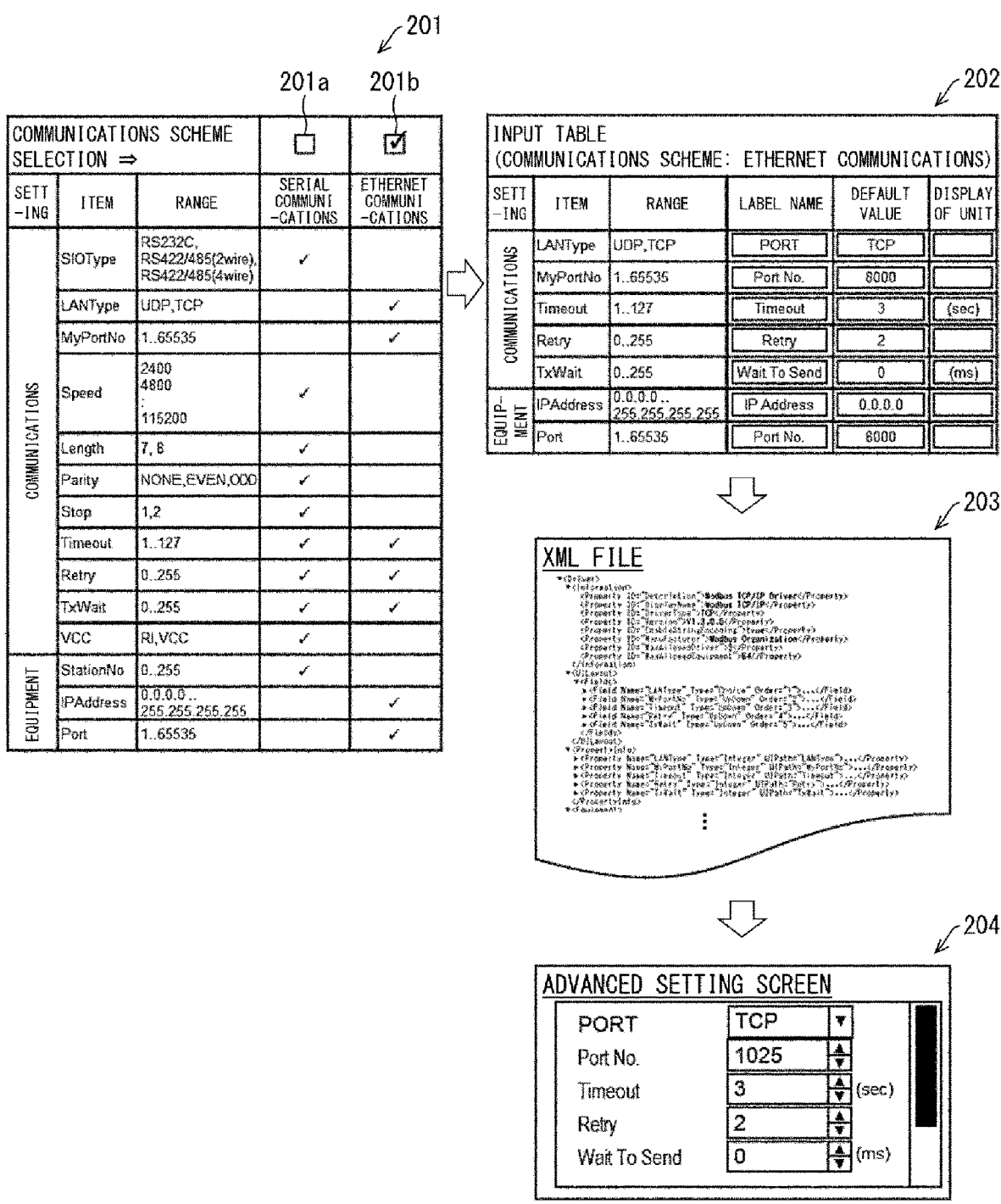
FIG. 14 is a diagram of a procedure in which the PC illustrated in FIG. 13 provides a drawing PC with drawing information.
Figure 15:
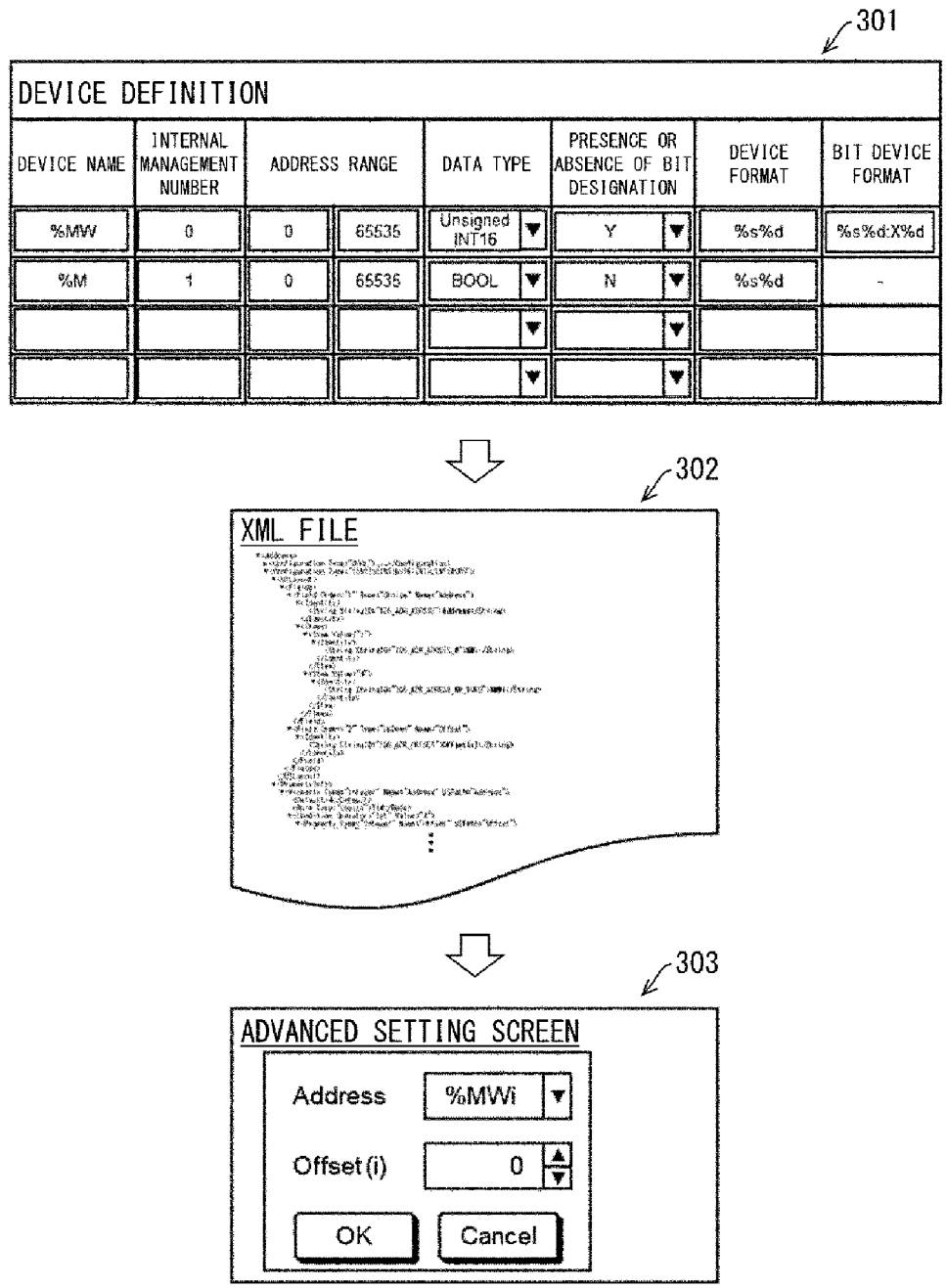
FIG. 15 is a diagram of a procedure in which the PC illustrated in FIG. 13 provides the drawing PC with another drawing information.

FIG. 13 is a block diagram of the system configuration of a PC 1A in accordance with Embodiment 2. FIG. 14 is a diagram of a procedure in which the PC 1A provides a drawing PC 7 with drawing information. FIG. 15 is a diagram of a procedure in which the PC 1A provides the drawing PC 7 with another drawing information.

The PC 1A has the same hardware configuration as that of the PC 1 described above, as illustrated in FIG. 1. Further, the PC 1A includes a protocol driver creating section 5A, as illustrated in FIG. 13. Like the protocol driver creating section 5 of the PC 1, the protocol driver creating section 5A includes the frame designing section 51 and the protocol driver generating section 52. In addition, the protocol driver creating section 5A includes a setting information creating section 53.

The setting information creating section 53 creates setting information which is drawing information. The setting information is information for creating, in accordance with a communications protocol created by the protocol driver generating section 52, a screen on which to input configuration information on configuration of the communications protocol. In addition, the protocol driver creating section 5A sends, to the drawing PC 7 via the communicating section 17, the setting information created by the setting information creating section 53. Besides the sending of the setting information via the communicating section 17, downloading setting information via the Internet and copying setting information with use of a storage device can be used.

The drawing PC 7 is a personal computer and includes a screen creating section 71. The screen creating section 71 creates an HMI screen. This creation is implemented by executing an application program for creating a screen. Note that the PC 1A and the drawing PC 7 may be one and the same personal computer.

The setting information creating section 53 acquires information that is necessary in the stage where the protocol driver generating section 52 generates a protocol driver, to create a communications scheme screen 201, illustrated in FIG. 14, for selecting a communications scheme. The setting information creating section 53 causes the communications scheme screen 201 to be displayed on the display panel 15, to present the same to the user.

The communications scheme screen 201 is a screen on which indicated in a tabular form are various items concerning communications and various items concerning equipment both of which are specified for each of the communications scheme of serial communications and the communications scheme of Ethernet (registered trademark) communications. The various items that are applicable are marked with a checkmark. The communications scheme screen 201 is provided with check boxes 201a and 201b which a user uses to select serial communications or Ethernet (registered trademark) communications.

The various items specified on the communications scheme screen 201 are settings concerning the environment in which the protocol driver operates. Specifically, the various items are used for making a setting as to communications on an HMI screen in accordance with the communications protocol or for making a setting for communications with the controller 3 in accordance with the communications protocol.

The setting information creating section 53 extracts the various items applicable to the communications scheme selected on the communications scheme screen 201 to create an input table 202. The input table 202 illustrated in FIG. 14 is applicable to Ethernet (registered trademark) communications. The input table 202 contains the range as to each of the various items, the label name of each of the various items, the default value within the range, and the unit of a numerical value.

The setting information creating section 53 also creates an XML file 203 in accordance with the input table 202. The XML file 203 is a file in which an advanced setting screen 204 is described in an XML format, the advanced setting screen 204 being referred to by the screen creating section 71 at the time of setting of the HMI screen. The XML file 203 is sent, as setting information, by the protocol driver creating section 5A to the drawing PC 7.

The screen creating section 71 executes the XML file 203 to cause a display section of the drawing PC 7 to display the advanced setting screen 204. The advanced setting screen 204 contains the label name of each of the various items and the default value for each label name that are specified in the input table 202. The alternatives (UDP, TCP) for each label name can be selected within the above range via a spin button. The value for each label name can be increased and decreased within the above range via the spin button. The screen creating section 71 sets the alternatives and the value for each label name in the advanced setting screen 204 to those determined through the actions of a user. Note that the advanced setting screen 204 may be displayed on the programmable display 2. This enables a user to make a setting by performing, on the advanced setting screen 204 displayed, input actions via the touch panel 29.

The IP address, which is not indicated in the advanced setting screen 204, cannot be determined in the stage of creation of a communications protocol. Thus, a user who uses the communications protocol finally determines the IP address on the advanced setting screen 204.

In the stage where the protocol driver generating section 52 generates the communications protocol, the setting information creating section 53 acquires information on the device memory to create a device definition screen 301, illustrated in FIG. 15, having the definition of the device memory indicated therein. The setting information creating section 53 causes the device definition screen 301 to be displayed on the display panel 15, to present the same to the user. The device definition screen 301 contains, for example, a device name, an internal management number, an address range, a data type (selectable), presence or absence (selectable) of bit designation, a device format, and a bit device format.

The setting information creating section 53 also creates an XML file 302 in accordance with the device definition screen 301. The XML file 302 is a file in which an advanced setting screen 303 is described in an XML format, the advanced setting screen 303 being referred to by the screen creating section 71 at the time of setting of the HMI screen. The XML file 302 is sent, as setting information, by the protocol driver creating section 5A to the drawing PC 7, etc.

The screen creating section 71 executes the XML file 302 to cause the display section of the drawing PC 7 to display the advanced setting screen 303. The advanced setting screen 303 contains an address specified with a device name and the offset value of the address. The address is selectable within the above address range, and the offset value can be increased and decreased. The screen creating section 71 sets the address in the advanced setting screen 303.

As described above, in the PC 1 in accordance with Embodiment 2, the protocol driver creating section 5A includes the setting information creating section 53. This makes it possible to use the information on the protocol driver to create configuration information on configuration of the communications protocol. It is therefore possible to more efficiently carry out the setting of a screen than in a case where such configuration information is created independently of the creation of a protocol driver.

Embodiment 3

Figure 16:
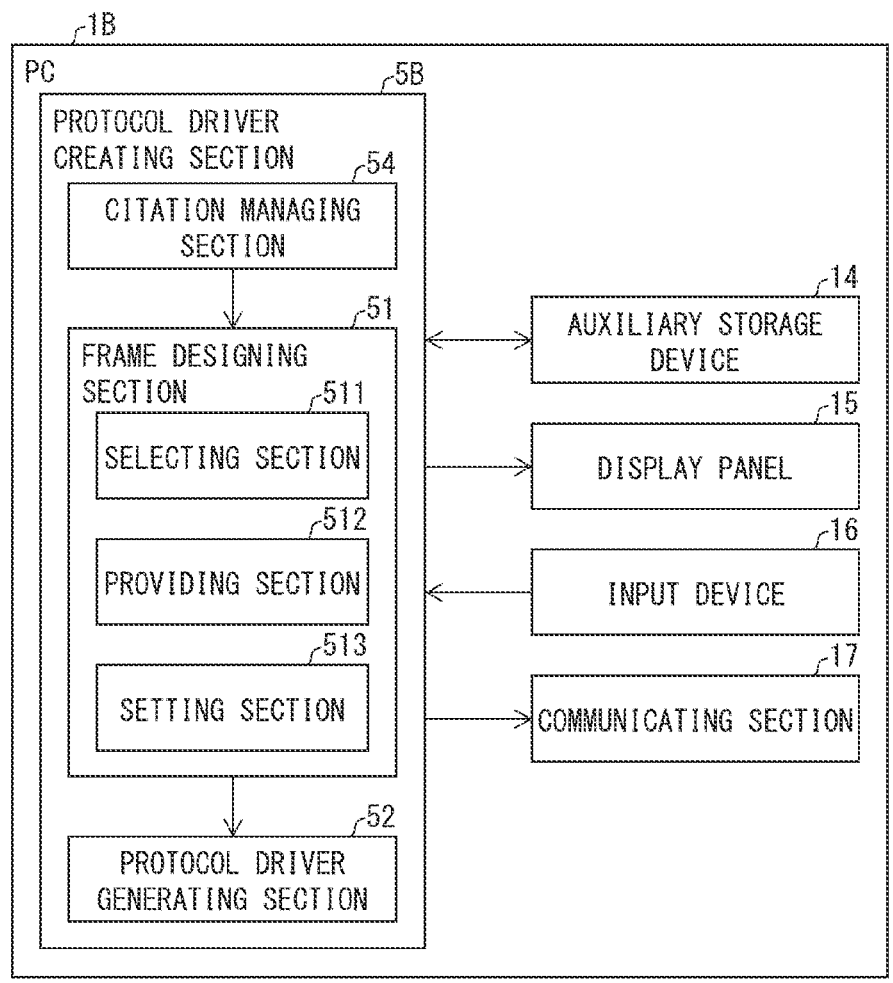
FIG. 16 is a block diagram of the system configuration of a PC in accordance with Embodiment 3 of the present invention.
Figure 17:
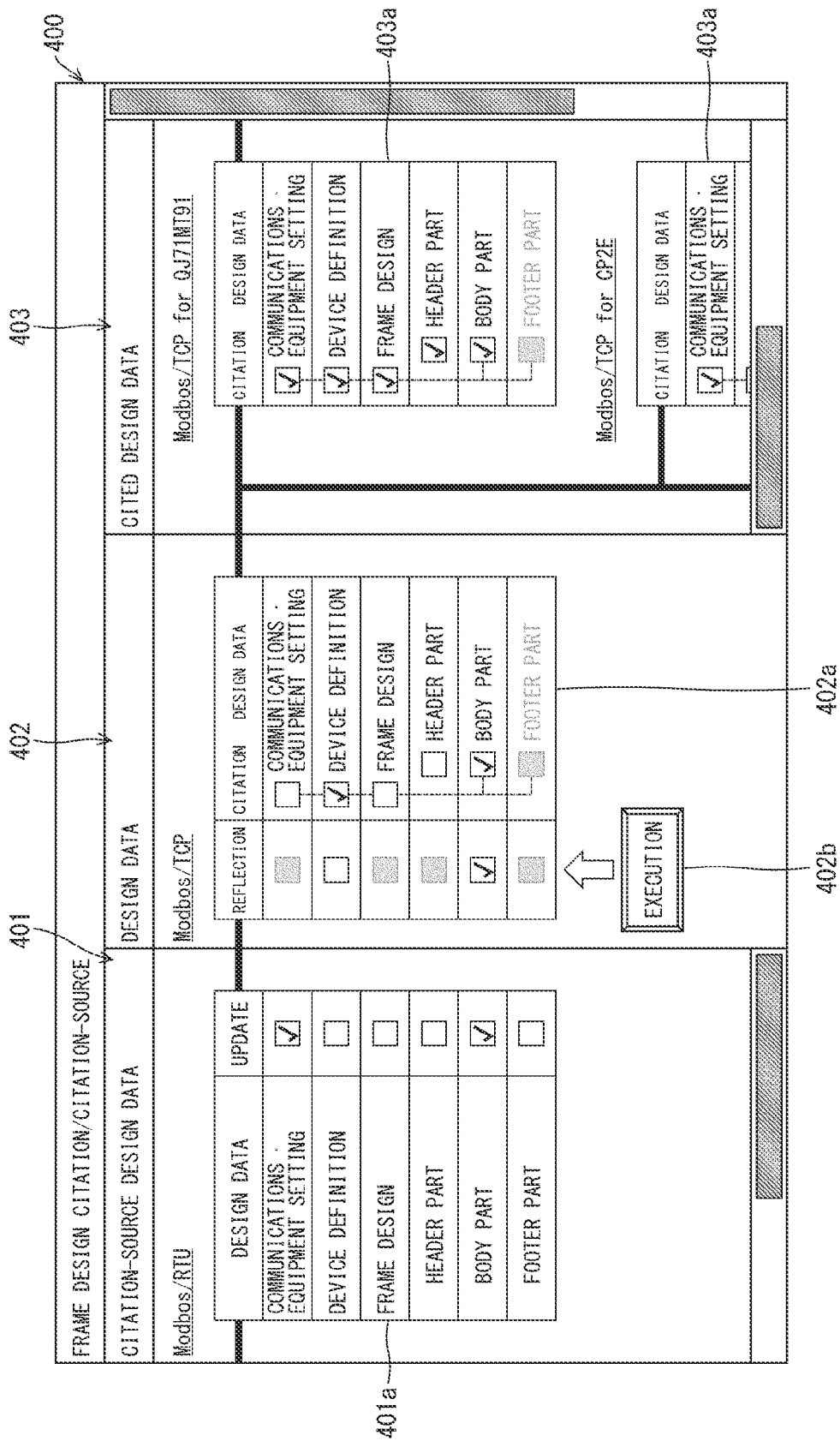
FIG. 17 is a diagram of a management screen for managing items to be carried over from frame design data already designed so that the PC illustrated in FIG. 16 refers to the designed frame design data to create new frame design data.

The following description will discuss Embodiment 3 of the present invention on the basis of FIGS. 1, 16, and 17. In Embodiment 3, a component the same in function as a component in Embodiment 1 is assigned the same reference sign as is the component in Embodiment 1, and the description thereof is omitted.

FIG. 16 is a block diagram of the system configuration of a PC 1B in accordance with Embodiment 3. FIG. 17 is a diagram of a management screen for managing items to be carried over from frame design data already designed so that the PC 1B refers to the designed frame design data to create new frame design data.

The PC 1B has the same hardware configuration as that of the PC 1 described above, as illustrated in FIG. 1. Further, the PC 1B includes a protocol driver creating section 5B, as illustrated in FIG. 16. Like the protocol driver creating section 5 of the PC 1, the protocol driver creating section 5B includes the frame designing section 51 and the protocol driver generating section 52. In addition, the protocol driver creating section 5B includes a citation managing section 54 (managing section).

The frame designing section 51 in accordance with Embodiment 3 accepts, in a changeable manner, design of each segment by the selecting section 511, disposition of an element by the providing section 512, and setting of a property by the setting section 513, in accordance with an already designed communications frame (designed communications frame). The designed communications frame is imported from outside and saved as the frame design data in the auxiliary storage device 14.

Further, the selecting section 511, the providing section 512, and the setting section 513 of the frame designing section 51 accepts and changes, in the frame design screen 100, the design of each segment, the disposition of an element, and the setting of a property, respectively. The frame designing section 51 saves, in the auxiliary storage device 14, frame design data created through such a change.

This makes it possible to design a new communications frame by using an already designed communications frame and changing a part of the already designed communications frame. It is therefore possible to efficiently design a communications frame.

Communications protocols partially resemble each other in format. For example, as to the communications protocol, Modbus (registered trademark), since the manner of communication according to the protocol is open to the public, many controllers using Modbus (registered trademark) have emerged.

However, the PLC to be used as the controller 3 varies in model according to whether the number of devices is large or small. In addition, controllers, used as the controller 3, such as temperature controllers or motor controllers differ in that, for example, a device range is small or a distinctive numerical value is entered in the device having the device address. Even if a communications protocol which is created so as to be versatile is used, communications are established. However, in a case where a design is such that an error occurs when a numerical value entered in the device exceeds a specified range, it is necessary to design a dedicated communications protocol.

For example, it is possible at the time of designing a communications frame to make a design such that when a particular value is entered in a certain device address, no error occurs for a versatile communications protocol but an error occurs upon the input of the particular value to the device address for a dedicated communications protocol. In a case of attempting to configure in detail limitation on the specification of the controller 3 to be connected to the programmable display 2 and disposition of a device such that the environment of the device is included as well, there are derivative many communications protocols. Creating all of these communications protocols from scratch requires considerable effort. To deal with this, by citing a part of an already created communications protocol and changing other detailed parts that differ, it is possible to reduce the amount of effort and erroneous configurations.

For example, it is possible to, create a communications protocol for Modbus (registered trademark)/TCP (Ethernet (registered trademark) communications) from a Modbus (registered trademark)/RTU (serial communications) protocol and it is also possible to create, from this communications protocol, a communications protocol for a certain PLC, as illustrated in FIG. 17.

The citation managing section 54 manages items to be carried over from a designed communications frame, regarding the design of each segment by the selecting section 511, the disposition of the elements of each segment by the providing section 512, and the setting of a property by the setting section 513. The citation managing section 54 also creates a management screen 400 illustrated in FIG. 17, on the basis of, for example, an imported designed communications frame and a communications frame created by making a change to the imported designed communications frame, the communications frames being saved in the auxiliary storage device 14. The management screen 400 includes a citation-source design data display area 401, a design data display area 402, and a citation design data display area 403.

The citation-source design data display area 401 includes a design data list 401*a*. The design data list 401*a* displays, in a tabular form, items as to the frame design data of the imported designed communications frame. The design data list 401*a* is provided with, for each of the items, a check box indicating that the corresponding item has been updated.

The design data display area 402 contains a design data list 402*a*. The design data list 402*a* displays, in a tabular form, items as to frame design data (derivative design data) created by making a change to the designed communications frame. The design data list 402*a* is provided with, for each of the items, a check box for reflecting an update to the design data list 401*a*. The design data list 402*a* is also provided with, for each of the items, a check box for selecting an item to be cited from the citation-source design data display area 401.

The citation design data display area 403 contains a design data list 403*a*. The design data list 403*a* displays, in a tabular form, items as to the frame design data created on the basis of the above derivative design data. The design data list 403*a* is provided with, for each of the items, a check box for selecting an item to be cited from the design data display area 402.

As described above, the protocol driver creating section 5B includes the citation managing section 54. This makes it possible to clearly understand the items to be carried over from the designed communications frame.

Specifically, the citation managing section 54 puts, in the design data lists 402*a* and 403*a*, a checkmark in the check box of an item cited from the frame design data which is the source of citation. For example, since the header and the footer differ from each other between RTU (serial communications) and TCP (Ethernet (registered trademark) communication), it is impossible to cite an item from the RTU and apply the same to the TCP. For the controller 3 capable of both the serial communications and the Ethernet (registered trademark) communications, the device definition is the same and the configuration of the body part remains unchanged accordingly. This makes it possible to cite the device definition and the configuration of the body part.

In addition, when the imported designed communications frame is modified, by the frame designing section 51, to be updated, the citation managing section 54 puts a checkmark in the check box of the updated item in the design data list 401*a*. When a user puts a checkmark in the check box for reflecting the update in the design data list 402*a* and presses an execution button 402*b*, the frame designing section 51 is instructed by the citation managing section 54 to reflect the above update. This causes the derivative design data to be updated with the frame design data, which is the source of the citation.

Thus, the presence or absence of a checkmark in the check boxes indicates the status of citation and the status of the reflection of update. This makes it possible to visually understand whether a change needs to be made to the frame design data which is the source of citation. In addition, the disposition of the design data lists 401*a*, 402*a*, and 403*a* from left to right in this order in the management screen 400 makes visually easy the citation relationship of frame design data among the design data lists.

Note that the check boxes that are shaded in the design data lists 402*a* and 403*a* indicate the items that are not put to use, and are unselectable.

Embodiment 4

Figure 18:
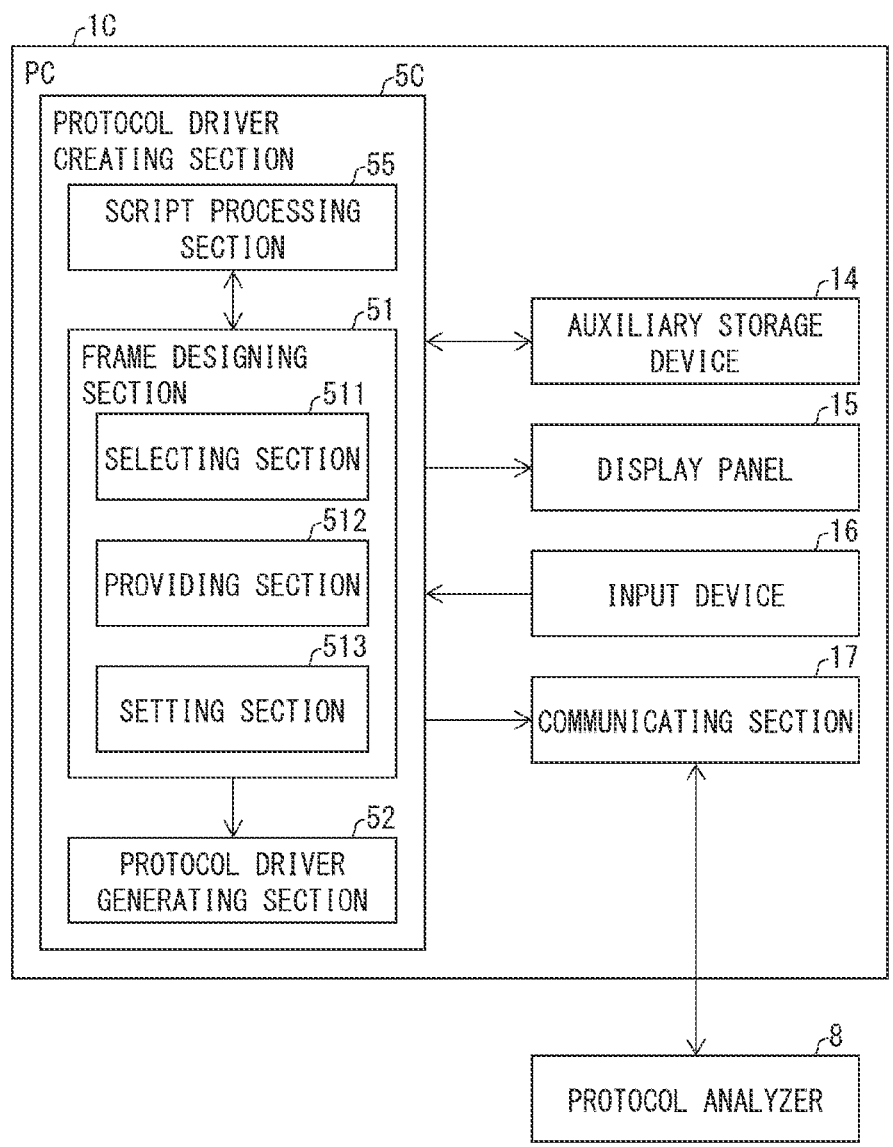
FIG. 18 is a block diagram of the system configuration of a PC in accordance with Embodiment 4 of the present invention.

The following description will discuss Embodiment 4 of the present invention on the basis of FIGS. 1 and 18. In Embodiment 4, a component the same in function as a component in Embodiment 1 is assigned the same reference sign as is the component in Embodiment 1, and the description thereof is omitted.

FIG. 18 is a block diagram of the system configuration of a PC 1C in accordance with Embodiment 4.

The PC 1C has the same hardware configuration as that of the PC 1 described above, as illustrated in FIG. 1. Further, the PC 1C includes a protocol driver creating section 5C, as illustrated in FIG. 18. Like the protocol driver creating section 5 of the PC 1, the protocol driver creating section 5C includes the frame designing section 51 and the protocol driver generating section 52. In addition, the protocol driver creating section 5C includes a script processing section 55 (conversion information creating section).

The PLC is connected to a protocol analyzer 8 via a communicating section 17 in a manner that enables the PLC and the protocol analyzer 8 to communicate with each other. The protocol analyzer 8 analyzes a communications protocol contained in data which is being communicated by a protocol driver, i.e., data being sent through a communication cable, and displays the result of decoding of the communications protocol in the form of a row of numerical values. Further, the protocol analyzer 8 converts the numerical values obtained through the decoding, into human-readable significant information (expression form) in accordance with conversion information given from outside.

The script processing section 55 creates, in accordance with the communications frame containing a segment constituted by elements whose properties have been set, the above conversion information to be provided to the protocol analyzer 8. Specifically, the script processing section 55 extracts information on the structure of the communications frame from the communications frame (frame design data) saved in the auxiliary storage device 14, and generates, in accordance with this information, a script, which is an example of the form of conversion information that can be interpreted by the protocol analyzer 8.

The protocol driver creating section 5C exports the above script to the protocol analyzer 8. The protocol analyzer 8 imports the above script to convert the numerical values into a visually easy-to-see form. For example, the sight of a start code shows that the communications frame starts at the location of the start code, and also shows the possibility of presence of, for example, a command code, an address, and a data count which follow the start code.

As described above, the PC 1C includes the protocol driver creating section 5C that includes the script processing section 55. With this arrangement, it is possible to easily create conversion information when the communications protocol created by the PC 1C is analyzed via the protocol analyzer 8.

In a case where a script for the protocol analyzer 8 has been created in advance and provided to the protocol analyzer 8, this script may be imported from the protocol analyzer 8, to be used as the frame design data.

Therefore, the frame designing section 51 designs a communications frame in accordance with the above script to be used by the protocol analyzer 8 to convert, into significant information, numerical values obtained by decoding of the communications protocol already created. This makes it possible to use a script used in the protocol analyzer 8 to design a communications frame. It is therefore possible to efficiently design a communications frame.

Assume, for example, that there is a script created at the time of analysis of a communications protocol used in a supervisory control and data acquisition (SCADA) system, and it has been confirmed by the analysis that this communications protocol works normally. In this case, a protocol driver compliant with the communications protocol cannot be applied, as it is, to the programmable display 2. To address this, importing this script to the PC 1C makes it possible to use, in the frame designing section 51, the configuration of a command described in the script.

[Software Implementation Example]

It is possible to implement the functions of the PC1 and the PC 1A to the PC 1C (hereinafter, referred to simply as PC 1) by a program for causing the PC 1 to operate. The program causes the PC 1 to function as each of the sections included in the protocol driver creating sections 5, 5A to 5C.

In this case, at least one CPU 11 and at least one main memory 12 are included, in the PC 1, as hardware for executing the program. The CPU 11 and the main memory 12 execute the above program, so that the functions described in the above embodiments are implemented.

The program may be stored in one or more non-transitory, computer-readable storage media. The storage media may be included in the PC1, or may not be included in the PC1. In the latter case, the program may be supplied to or made available to the PC1 via any wired or wireless transmission medium.

Alternatively, the functions of the protocol driver creating sections 5, 5A to 5C can be partially or completely implemented by logic circuits. For example, the scope of the present invention also encompasses an integrated circuit in which formed are logic circuits that function as the protocol driver creating sections 5, 5A to 5C.

ADDITIONAL REMARKS

The present invention is not limited to the embodiments, but can be altered by a skilled person in the art within the scope of the claims. Any embodiment based on a proper combination of technical means disclosed in the different embodiments is also encompassed in the technical scope of the present invention.

Aspects of the present invention can also be expressed as follows:

A protocol driver creating device, in accordance with an aspect of the present invention, for creating, with use of a graphical user interface, a protocol driver which is compliant with a communications protocol and which is used by a programmable display for communicating with a controller, the protocol driver creating device including: a frame designing section configured to design a communications frame of the communications protocol; and a generating section configured to generate the protocol driver in accordance with the communications frame having been designed, the frame designing section including: a providing section configured to provide a graphics object that graphically represents an element of at least one segment of the communications frame and that contains size information on the size of the element, in a manner that enables the graphics object to be selected and to be disposed in the at least one segment; and a setting section configured to set attribute information on the attribute of the element represented by the graphics object having been disposed, and to perform at least one of the group consisting of provision of the attribute information in a manner selectable from among alternatives and provision of an input field that enables the attribute information to be inputted, in order to set the attribute information.

With this arrangement, it is possible to provide a user interface via which to select and dispose a graphics object representing an element and to set attribute information on the attribute of the disposed element and which is therefore clear and very easy to understand. This makes it possible to efficiently create a protocol driver.

In the protocol driver creating device, the frame designing section further includes a selecting section configured to make selectable the plurality of segments that constitute the communications frame, to make the communications frame capable of being designed in such a manner that the plurality of segments are separately set.

With this arrangement, it is possible to, for each of the plurality of segments into which the communications frame is divided, determine the sizes of the elements constituting that segment and set attribute information on the attribute of each of the elements. This makes it possible to efficiently design a communications frame constituted by a plurality of segments.

In the protocol driver creating device, the selecting section may provide a header part, a body part, and a footer part which are the plurality of segments.

With this configuration, for the body part, which is the essential component of a communications frame, the sizes of the elements of the body part may be set, and information on the attributes of the elements of the body part may be set, and for at least one part selecting from the group consisting of the header part and the footer part, which are provided where necessary, the sizes of the elements of the at least one part may be determined and information on the attributes of the elements of the at least one part may be set.

In the protocol driver creating device, the frame designing section may accept, in a changeable manner, design of the at least one segment by the selecting section, disposition of the element by the providing section, and setting of the attribute information by the setting section, in accordance with a designed communications frame that is the communications frame already designed, and the protocol driver creating device may further include a managing section configured to manage an item to be carried over from the designed communications frame, regarding the design of the at least one segment by the selecting section, the disposition of the element by the providing section, and the setting of the attribute information by the setting section.

With this configuration, it is possible to clearly understand the item to be carried over from an already designed communications frame when a new communications frame is designed by using the designed communications frame and changing a part of the already designed communications frame.

The protocol driver creating device may further include a setting information creating section configured to create, in accordance with the protocol driver having been generated, setting information for creating a screen on which to input information on configuration of the communications protocol.

With this arrangement, setting information on the setting of the above screen is created with use of information on the protocol driver. This makes it possible to more efficiently carry out the setting of a screen than in a case where such setting information is created independently of the creation of a protocol driver.

The protocol driver creating device may further include a conversion information creating section configured to create, in accordance with the communications frame, conversion information for converting, into significant information, a numerical value into which a protocol analyzer decodes the communications protocol contained in data which is being communicated.

With this arrangement, in a case where communications are carried out with use of a protocol driver created by the protocol driver creating device, when a communications protocol is analyzed via the protocol analyzer, it is possible to easily create conversion information.

In the protocol driver creating device, the frame designing section may design the communications frame in accordance with conversion information for converting, into significant information, a numerical value into which a protocol analyzer decodes a communications protocol already created.

With the above configuration, it is possible to design a communications frame by using conversion information used in a protocol analyzer. This makes it possible to efficiently design a communications frame.

REFERENCE SIGNS LIST 1, 1A, 1B, 1C: PC (Protocol driver creating device)
2: Programmable display
51: Frame designing section
52: Protocol driver generating section (generating section)
53: Setting information creating section
54: Citation managing section (managing section)
55: Script processing section (conversion information creating section)
101a to 101e: Graphics object
511: Selecting section
512: Providing section
513: Setting section

The invention claimed is:

1. A protocol driver creating device for creating, with use of a graphical user interface, a protocol driver which is compliant with a communications protocol and which is used by a programmable display for communicating with a controller, the protocol driver creating device comprising:
    a frame designing section configured to design a communications frame of the communications protocol; and
    a generating section configured to generate the protocol driver in accordance with the communications frame having been designed,
    the frame designing section including:
    a providing section configured to provide a graphics object that graphically represents an element of at least one segment of the communications frame and that contains size information on the size of the element, in a manner that enables the graphics object to be selected and to be disposed in the at least one segment; and
    a setting section configured to set attribute information on the attribute of the element represented by the graphics object having been disposed, and to perform at least one of the group consisting of provision of the attribute information in a manner selectable from among alternatives and provision of an input field that enables the attribute information to be inputted, in order to set the attribute information,
    the graphics object having a shape which represents a size of the element,
    the providing section being configured to accept a user action of drag and drop for selecting and disposing the graphics object disposed in an area which is included in a frame design screen, and form the segment by adding the graphics object disposed, and
    the setting section being configured to accept, on the frame design screen, at least one of the group consisting of a user action of selecting the attribute information from among alternatives and a user action of inputting the attribute information.

2. The protocol driver creating device according to claim 1, wherein:
    the at least one segment includes a plurality of segments; and
    the frame designing section further includes a selecting section configured to make selectable the plurality of segments that constitute the communications frame, to make the communications frame capable of being designed in such a manner that the plurality of segments are separately set.

3. The protocol driver creating device according to claim 2, wherein
the selecting section is configured to provide a header part, a body part, and a footer part which are the plurality of segments.

4. The protocol driver creating device according to claim 2, wherein:
the frame designing section is configured to accept, in a changeable manner, design of the at least one segment by the selecting section, disposition of the element by the providing section, and setting of the attribute information by the setting section, in accordance with a designed communications frame that is the communications frame already designed;
the protocol driver creating device further comprises a managing section configured to manage at least one usable part of the designed communications frame, regarding the design of the at least one segment by the selecting section, the disposition of the element by the providing section, and the setting of the attribute information by the setting section;
the managing section is configured to create a management screen which includes a list of items of the designed communications frame; and
the management screen is configured to, for each of the items, when that item is cited, put a mark to indicate that citation has been made.

5. The protocol driver creating device according to claim 1, further comprising
a setting information creating section configured to create, in accordance with the protocol driver having been generated, setting information for creating a screen on which to input information on configuration of the communications protocol,
the programmable display being configured to display a human machine interface (HMI) screen for displaying various kinds of data acquired from the controller and accepting an input action of a user who issues an instruction to the controller, and
the setting information creating section being configured to create the setting information, which is drawing information used by a screen creating device to create the HMI screen.

6. The protocol driver creating device according to claim 1, further comprising
a conversion information creating section configured to create conversion information for converting, into human-readable significant information, a numerical value into which a protocol analyzer decodes the communications protocol contained in data which is being communicated, by converting a form of information on a structure of the communications frame extracted from the communications frame, into a form that can be interpreted by the protocol analyzer.

7. The protocol driver creating device according to claim 1, wherein
the frame designing section is configured to design the communications frame in accordance with conversion information for converting, into significant information, a numerical value into which a protocol analyzer decodes a communications protocol already created, the conversion information including information on a structure of the communications frame.

8. The protocol driver creating device according to claim 4, wherein:
the managing section is configured to put a mark to indicate an item of the designed communications frame, the item having undergone an update; and
when the item is selected by a user, the frame designing section is configured to reflect, in a communications frame to be newly designed, the update of the item.

* * * * *